US010136141B2

(12) United States Patent
Pu et al.

(10) Patent No.: US 10,136,141 B2
(45) Date of Patent: Nov. 20, 2018

(54) DETERMINING QUANTIZATION PARAMETER (QP) VALUES AND DELTA QP VALUES FOR PALETTE CODED BLOCKS IN VIDEO CODING

(71) Applicant: QUALCOMM Incorporated, San Diego, CA (US)

(72) Inventors: Wei Pu, San Diego, CA (US); Joel Sole Rojals, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 14/736,111

(22) Filed: Jun. 10, 2015

(65) Prior Publication Data
US 2015/0365671 A1 Dec. 17, 2015

Related U.S. Application Data

(60) Provisional application No. 62/010,979, filed on Jun. 11, 2014, provisional application No. 62/066,797, (Continued)

(51) Int. Cl.
*H04N 19/186* (2014.01)
*H04N 19/176* (2014.01)
(Continued)

(52) U.S. Cl.
CPC ......... *H04N 19/186* (2014.11); *H04N 19/117* (2014.11); *H04N 19/124* (2014.11);
(Continued)

(58) Field of Classification Search
CPC .... H04N 19/176; H04N 19/124; H04N 19/46; H04N 19/186; H04N 19/593;
(Continued)

(56) References Cited

U.S. PATENT DOCUMENTS

| 5,301,032 A | * | 4/1994 | Hong ................. H04N 19/105 |
| | | | 375/240.23 |
| 9,654,806 B2 | | 5/2017 | Zou et al. |

(Continued)

FOREIGN PATENT DOCUMENTS

WO 2012118421 A1 9/2012

OTHER PUBLICATIONS

Second Written Opinion from International Application No. PCT/US2015/035301, dated Jun. 8, 2016, 9 pp.

(Continued)

*Primary Examiner* — Dave Czekaj
*Assistant Examiner* — Kehinde Abimbola
(74) *Attorney, Agent, or Firm* — Shumaker & Sieffert, PA

(57) ABSTRACT

Techniques are described for palette-based video coding. In palette-based coding, a video coder may form a so-called "palette" as a table of colors for representing video data of a given block of video data. Rather than coding actual pixel values or their residuals for the given block, the video coder may code index values for one or more of the pixels. The index values map the pixels to entries in the palette representing the colors of the pixels. Techniques are described for determining the application of deblocking filtering for pixels of palette coded blocks at a video encoder or a video decoder. In addition, techniques are described for determining quantization parameter (QP) values and delta QP values used to quantize escape pixel values of palette coded blocks at the video encoder or the video decoder.

29 Claims, 6 Drawing Sheets

Related U.S. Application Data filed on Oct. 21, 2014, provisional application No. 62/066,851, filed on Oct. 21, 2014.

(51) Int. Cl.

| | | |
|---|---|---|
| *H04N 19/117* | (2014.01) | |
| *H04N 19/124* | (2014.01) | |
| *H04N 19/46* | (2014.01) | |
| *H04N 19/157* | (2014.01) | |
| *H04N 19/182* | (2014.01) | |
| *H04N 19/86* | (2014.01) | |

(52) U.S. Cl.
CPC ......... *H04N 19/157* (2014.11); *H04N 19/176* (2014.11); *H04N 19/182* (2014.11); *H04N 19/46* (2014.11); *H04N 19/86* (2014.11)

(58) Field of Classification Search
CPC ...... H04N 19/117; H04N 19/93; H04N 19/94; H04N 19/127; H04N 19/14; H04N 19/18; H04N 19/583; H04N 19/157; H04N 19/86; H04N 19/182
See application file for complete search history.

(56) References Cited

U.S. PATENT DOCUMENTS

| | | | |
|---|---|---|---|
| 2003/0161541 A1* | 8/2003 | Ridge | H04N 1/644 382/245 |
| 2008/0120129 A1 | 5/2008 | Seubert et al. | |
| 2009/0161973 A1* | 6/2009 | Stefanov | H04N 19/93 382/246 |
| 2010/0046628 A1 | 2/2010 | Bhaskaran et al. | |
| 2011/0103473 A1 | 5/2011 | Li et al. | |
| 2012/0082219 A1 | 4/2012 | Sun et al. | |
| 2012/0114034 A1* | 5/2012 | Huang | H04N 19/70 375/240.03 |
| 2012/0314943 A1* | 12/2012 | Guerrero | G06T 9/00 382/166 |
| 2013/0034152 A1* | 2/2013 | Song | H04N 19/119 375/240.03 |
| 2013/0077871 A1* | 3/2013 | Lu | G06K 9/36 382/197 |
| 2013/0176211 A1* | 7/2013 | Inada | H04N 19/593 345/156 |
| 2013/0182765 A1 | 7/2013 | Gao et al. | |
| 2014/0146875 A1 | 5/2014 | Chong et al. | |
| 2015/0063459 A1 | 3/2015 | Hsu et al. | |
| 2015/0186100 A1* | 7/2015 | Tsai | G06F 3/1454 375/240.12 |
| 2015/0264365 A1* | 9/2015 | Tsai | H04N 19/94 375/240.03 |
| 2015/0264395 A1 | 9/2015 | Tourapis et al. | |
| 2015/0341643 A1* | 11/2015 | Xu | H04N 19/593 375/240.02 |
| 2015/0341660 A1 | 11/2015 | Joshi et al. | |
| 2015/0365670 A1* | 12/2015 | Chang | H04N 19/119 375/240.02 |
| 2015/0365685 A1* | 12/2015 | Chang | H04N 19/176 382/166 |
| 2015/0365695 A1 | 12/2015 | Pu et al. | |
| 2015/0381994 A1* | 12/2015 | Yu | H04N 19/186 375/240.24 |
| 2016/0007038 A1* | 1/2016 | Chou | H04N 19/46 375/240.03 |
| 2016/0057434 A1* | 2/2016 | Lai | H04N 19/176 382/233 |
| 2016/0100161 A1* | 4/2016 | Chang | H04N 19/46 375/240.12 |
| 2016/0100178 A1* | 4/2016 | Lin | H04N 19/186 382/166 |
| 2016/0100179 A1* | 4/2016 | He | H04N 19/176 375/240.25 |
| 2016/0277733 A1* | 9/2016 | Li | H04N 19/593 |
| 2016/0277761 A1* | 9/2016 | Li | H04N 19/124 |
| 2016/0286217 A1 | 9/2016 | Hsiang | |
| 2016/0301938 A1 | 10/2016 | Sun et al. | |
| 2016/0309183 A1 | 10/2016 | Sun et al. | |
| 2016/0316199 A1 | 10/2016 | Chuang et al. | |
| 2016/0323584 A1 | 11/2016 | Chuang et al. | |
| 2016/0323591 A1 | 11/2016 | Chuang et al. | |
| 2016/0323594 A1 | 11/2016 | Sun et al. | |
| 2016/0330481 A1 | 11/2016 | Zhang et al. | |
| 2016/0381388 A1 | 12/2016 | Kazui et al. | |
| 2017/0019677 A1 | 1/2017 | Sun et al. | |
| 2017/0054976 A1* | 2/2017 | Li | H04N 19/70 |
| 2017/0070748 A1* | 3/2017 | Li | H04N 19/176 |
| 2017/0099489 A1* | 4/2017 | Gisquet | H04N 19/126 |
| 2017/0127058 A1* | 5/2017 | Misra | H04N 19/70 |
| 2017/0127077 A1 | 5/2017 | Chuang et al. | |
| 2017/0142418 A1* | 5/2017 | Li | H04N 19/159 |
| 2017/0180737 A1 | 6/2017 | Ye et al. | |
| 2017/0230667 A1* | 8/2017 | Gisquet | H04N 19/147 |
| 2017/0238001 A1* | 8/2017 | Li | H04N 19/436 375/240.12 |
| 2017/0289572 A1* | 10/2017 | Ye | H04N 19/593 |
| 2017/0318301 A1* | 11/2017 | Li | H04N 19/186 |
| 2018/0054623 A1* | 2/2018 | Lin | H04N 1/644 |
| 2018/0084251 A1* | 3/2018 | Chang | H04N 19/182 |

OTHER PUBLICATIONS

Response to Second Written Opinion dated Jun. 8, 2016, from International Application No. PCT/US2015/035301, filed on Aug. 8, 2016, 6 pp.

International Preliminary Report on Patentability from International Application No. PCT/US2015/035301, dated Sep. 23, 2016, 12 pp.

Non-Final Office Action from U.S. Appl. No. 14/736,102 dated Jul. 7, 2017 (36 pages).

Response to Non-Final Office Action dated Jul. 7, 2017 from U.S. Appl. No. 14/736,102, filed Sep. 21, 2017 (9 pages).

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint

(56) References Cited

OTHER PUBLICATIONS

Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "Description of Screen Content Coding Technology Proposal by Qualcomm", JCT-VC Meeting, Valencia, (Joint Collaborative Team on Video Coding of ISO/IEC JTC1/SC29/WG11 and ITU-T SG.16), No. JCTVC-Q0031-v3, Mar. 28, 2014, XP030115916, 19 pp.
Flynn, et al., "BoG report on Range Extensions topics", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-O0352-v5, Nov. 2013; XP030115433, 49 pp.
Lee, et al., "cu qp delta enabling syntax," JCT-VC Meeting; MPEG Meeting; Jul. 11-20, 2012; Stockholm; (Joint Collaborative Team on Video Codingof ISO/IEC JTC1/SC29/WG11 and ITU-T SG.16); URL: http://wftp3.itu.int/av-arch/jctvc-site/,, No. JCTVC-J0220, Jul. 2, 2012, XP030112582, 7 pp.
Norkin, et al., "CE12.1: Ericsson deblocking filter", MPEG Meeting; Mar. 16-23, 2011; Geneva; (Motion Picture Expert Group or ISO/IEC JTC1/SC29/WG11),, No. m19803, Mar. 19, 2011, 17 pp., XP030048370.
Norkin, et al., "HEVC Deblocking Filter", IEEE Transactions on Circuits and Systems for Video Technology, vol. 22, No. 12, Dec. 1, 2012 (Dec. 1, 2012), pp. 1746-1754, XP011487156, ISSN: 1051-8215.
Pan, et al., "A Low-Complexity Screen Compression Scheme for Interactive Screen Sharing", IEEE Transactions on Circuits and Systems for Video Technology, IEEE Service Center, Piscataway, NJ, US, vol. 23, No. 6, Jun. 2013, pp. 949-960, XP011513107.
Sole, et al., "Non-SCCE3: Palette and deblocking," JCT-VC Meeting; Jun. 30-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R0213, Jun. 21, 2014, XP030116509, 6 pp.
Sole, et al., "Non-CE6: Delta QP Signalling for Palette", JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/ No. JCTVC-S0043, Oct. 8, 2014, XP030116771, 3 pp.
Sole, et al., "Non-SCCE3: Delta QP Signalling in Palette Mode", JCT-VC Meeting; Jun. 30-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/,, No. JCTVC-R0237, Jun. 21, 2014, XP030116541, 3 pp.
Flynn, et al., "High Efficiency Video Coding (HEVC) Range Extensions text specification: Draft 7," JCT-VC Meeting; Mar. 27-Apr. 4, 2014; (Joint Collaborative Team on Video Coding of ISO/IEC JTC1/SC29/WG11 and ITU-T SG.16 ); Apr. 10, 2014; No. JCTVC-Q1005_v4, 376 pp.
Joshi, et al., "High Efficiency Video Coding (HEVC) Screen Content Coding: Draft 1," JCT-VC Meeting; Jun. 30-Jul. 9, 2014; (Joint Collaborative Team on Video Coding of ISO/IEC JTC1/SC29/WG11 and ITU-T SG.16 ); Sep. 27, 2014; No. JCTVC-R1005_v3, 362 pp.
Joshi, et al., "High Efficiency Video Coding (HEVC) Screen Content Coding: Draft 2," JCT-VC Meeting; Jun. 30-Jul. 9, 2014; (Joint Collaborative Team on Video Coding of ISO/IEC JTC1/SC29/WG11 and ITU-T SG.16 ); Dec. 10, 2014; No. JCTVC-S1005, 374 pp.
International Search Report and Written Opinion from International Application No. PCT/US2015/035301, dated Sep. 25, 2015, 13 pp.
Response to Written Opinion dated Sep. 25, 2015, from International Application No. PCT/US2015/035301, filed on Apr. 11, 2016, 7 pp.
Pu, et al., "AHG10: Suggested Software for Palette Coding based on RExt6.0," JCT-VC Meeting; Mar. 27-Apr. 4, 2014; (Joint Collaborative Team on Video Coding of ISO/IEC JTC1/SC29/WG11 and ITU-T SG.16 ); No. JCTVC-Q0094, Mar. 19, 2014; 4 pp.
Flynn, et al., "High Efficiency Video Coding (HEVC) Range Extensions text specification: Draft 7," JCT-VC Meeting; Mar. 27-Apr. 4, 2014; (Joint Collaborative Team on Video Coding of ISO/IEC JTC1/SC29/WG11 and ITU-T SG.16 ); No. JCTVC-Q1005_v7; Jun. 10, 2014; 352 pp.
Sole, et al., "AhG13: Palette and deblocking," JCT-VC Meeting; Oct. 17-24, 2014; (Joint Collaborative Team on Video Coding of ISO/IEC JTC1/SC29/WG11 and ITU-T SG.16 ); No. JCTVC-S0096r1, Oct. 8, 2014; 9 pp.

* cited by examiner

DETERMINING QUANTIZATION PARAMETER (QP) VALUES AND DELTA QP VALUES FOR PALETTE CODED BLOCKS IN VIDEO CODING

This application claims the benefit of U.S. Provisional Application No. 62/010,979 filed Jun. 11, 2014, U.S. Provisional Application No. 62/066,797, filed Oct. 21, 2014, and U.S. Provisional Application No. 62/066,851, filed Oct. 21, 2014, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes techniques for palette-based video coding. In palette-based coding, a video coder (e.g., a video encoder or video decoder) may form a so-called "palette" as a table of colors for representing video data of a particular area (e.g., a given block). Palette-based coding may be especially useful for coding areas of video data having a relatively small number of colors. Rather than coding actual pixel values or their residuals for the given block, the video coder may code index values for one or more of the pixels. The index values map the pixels to entries in the palette representing the colors of the pixels. In this disclosure, techniques are described for determining the application of deblocking filtering for pixels of palette coded blocks at a video encoder or a video decoder. In addition, techniques are described for determining quantization parameter (QP) values and delta QP values used to quantize escape pixel values of palette coded blocks at the video encoder or the video decoder.

In one example, this disclosure is directed to a method of processing video data, the method comprising determining that a first block of video data is a palette coded block; determining a palette for the first block; determining color values for pixels within the first block with respect to the palette; reconstructing the first block of the video data based on the palette and the color values for the first block; based on the first block being a palette coded block, disabling deblocking filtering for first pixels within the reconstructed first block at a block boundary formed between the reconstructed first block and a reconstructed second block of video data; and determining whether to apply the deblocking filtering for second pixels within the reconstructed second block at the block boundary formed between the reconstructed first block and the reconstructed second block.

In another example, this disclosure is directed to a video processing device comprising a memory configured to store video data, and one or more processors in communication with the memory. The one or more processors are configured to determine that a first block of video data is a palette coded block; determine a palette for the first block; determine color values for pixels within the first block with respect to the palette; reconstruct the first block of the video data based on the palette and the color values for the first block; based on the first block being a palette coded block, disable deblocking filtering for first pixels within the reconstructed first block at a block boundary formed between the reconstructed first block and a reconstructed second block of video data; and determine whether to apply the deblocking filtering for second pixels within the reconstructed second block at the block boundary formed between the reconstructed first block and the reconstructed second block.

In another example, this disclosure is directed to a video processing device comprising means for determining that a first block of video data is a palette coded block; means for determining a palette for the first block; means for determining color values for one or more pixels within the first block with respect to the palette; means for reconstructing the first block of the video data based on the palette and the color values for the first block; means for, based on the first block being a palette coded block, disabling deblocking filtering for first pixels within the reconstructed first block at a block boundary formed between the reconstructed first block and a reconstructed second block of video data; and means for determining whether to apply the deblocking filtering for second pixels within the reconstructed second block at the block boundary formed between the reconstructed first block and the reconstructed second block.

In a further example, this disclosure is directed to a non-transitory computer-readable medium having stored thereon instructions for processing video data that, when executed, cause one or more processors to determine that a first block of video data is a palette coded block; determine a palette for the first block; determine color values for one or more pixels within the first block with respect to the palette; reconstruct the first block of the video data based on the palette and the color values for the first block; based on the first block being a palette coded block, disable deblocking filtering for first pixels within the reconstructed first block at a block boundary formed between the reconstructed first block and a reconstructed second block of video data; and determine whether to apply the deblocking filtering for second pixels within the reconstructed second block at the block boundary formed between the reconstructed first block and the reconstructed second block.

In one example, this disclosure is directed to a method of processing video data, the method comprising determining a palette for a palette coded block including zero or more palette entries that indicate one or more respective color values; determining whether at least one pixel within the palette coded block is coded as an escape pixel having a color value that is not included in the palette; based on the at least one pixel within the palette coded block being coded as an escape pixel, determining a palette quantization parameter (QP) value for the palette coded block, the palette QP value being adjusted from a predicted QP value; and based on the at least one pixel within the palette coded block being coded as an escape pixel, determining the color value for the escape pixel that is not included in the palette, and quantizing the color value for the escape pixel according to the palette QP value.

In another example, this disclosure is directed to a video processing device comprising a memory configured to store video data, and one or more processors in communication with the memory. The one or more processors are configured to determine a palette for a palette coded block including zero or more palette entries that indicate one or more respective color values; determine whether at least one pixel within the palette coded block is coded as an escape pixel having a color value that is not included in the palette; based on the at least one pixel within the palette coded block being coded as an escape pixel, determine a palette quantization parameter (QP) value for the palette coded block, the palette QP value being adjusted from a predicted QP value; and based on the at least one pixel within the palette coded block being coded as an escape pixel, determine the color value for the escape pixel that is not included in the palette, and quantize the color value for the escape pixel according to the palette QP value.

In another example, this disclosure is directed to a video processing device comprising means for determining a palette for a palette coded block including zero or more palette entries that indicate one or more respective color values; means for determining whether at least one pixel within the palette coded block is coded as an escape pixel having a color value that is not included in the palette; means for, based on the at least one pixel within the palette coded block being coded as an escape pixel, determining a palette quantization parameter (QP) value for the palette coded block, the palette QP value being adjusted from a predicted QP value; and means for, based on the at least one pixel within the palette coded block being coded as an escape pixel, determining the color value for the escape pixel that is not included in the palette, and quantizing the color value for the escape pixel according to the palette QP value.

In a further example, this disclosure is directed to a non-transitory computer-readable medium having stored thereon instructions for processing video data that, when executed, cause one or more processors to determine a palette for a palette coded block including zero or more palette entries that indicate one or more respective color values; determine whether at least one pixel within the palette coded block is coded as an escape pixel having a color value that is not included in the palette; based on the at least one pixel within the palette coded block being coded as an escape pixel, determine a palette quantization parameter (QP) value for the palette coded block, the palette QP value being adjusted from a predicted QP value; and based on the at least one pixel within the palette coded block being coded as an escape pixel, determine the color value for the escape pixel that is not included in the palette, and quantizing the color value for the escape pixel according to the palette QP value.

The details of one or more examples of the disclosure are set forth in the accompanying drawings and the description below. Other features, objects, and advantages will be apparent from the description, drawings, and claims.

DETAILED DESCRIPTION

Figure 1:
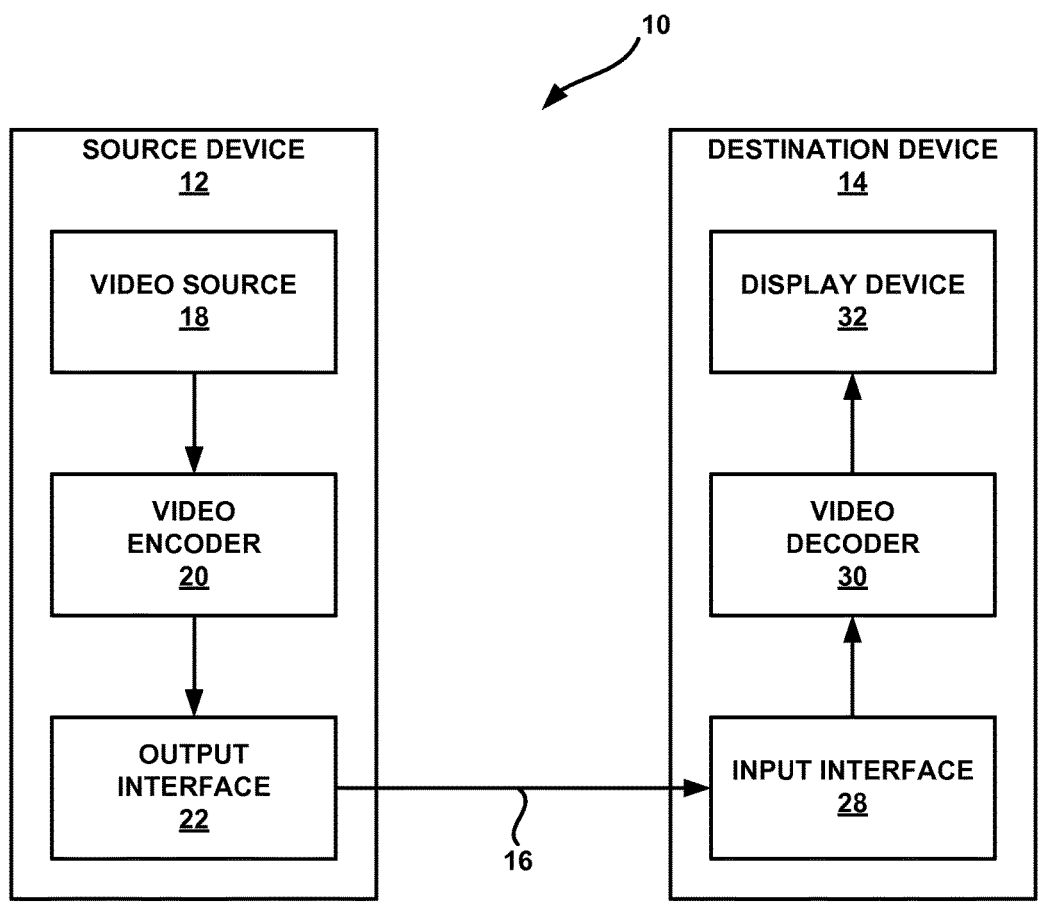
FIG. 1 is a block diagram illustrating an example video coding system that may utilize the techniques described in this disclosure.

This disclosure describes techniques for video coding and compression. In particular, this disclosure describes techniques to support coding of video content, especially screen content with palette-based coding. This disclosure describes multiple technical aspects of palette-based coding. In some examples, this disclosure describes techniques for determining the design and application of in-loop filtering (e.g., deblocking filtering and/or sample adaptive offset (SAO) filtering) for pixels of palette coded blocks. More specifically, techniques are described for determining the application of deblocking filtering for pixels along a block boundary formed by at least one palette coded block at a video encoder or a video decoder. In other examples, this disclosure describes techniques for determining quantization parameter (QP) values and delta QP values used to quantize escape pixel values of palette coded blocks at the video encoder or the video decoder.

In traditional video coding, images are assumed to be continuous-tone and spatially smooth. Based on these assumptions, various tools have been developed, such as block-based transform, filtering, etc., and such tools have shown good performance for natural content videos. In applications like remote desktop, collaborative work and wireless display, however, computer generated screen content (e.g., such as text or computer graphics) may be the dominant content to be compressed. This type of content tends to have discrete-tone, and feature sharp lines and high contrast object boundaries. The assumption of continuous-tone and smoothness may no longer apply for screen content, and thus traditional video coding techniques may not be efficient ways to compress video data including screen content.

This disclosure describes palette-based coding, which may be particularly suitable for screen generated content coding. For example, assuming a particular area of video data has a relatively small number of colors, a video coder (e.g., a video encoder or video decoder) may form a so-called "palette" to represent the video data of the particular area. The palette may be expressed as a table of colors for representing the video data of the particular area (e.g., a given block). For example, the palette may include the most dominant colors (i.e., pixel values) in the given block. In some cases, the most dominant colors may include the one or more colors that occur most frequently within the block. Additionally, in some cases, a video coder may apply a threshold value to determine whether a color is to be included as one of the most dominant colors in the block. The palette may be explicitly encoded and sent to a video decoder, predicted from previous palette entries, or a combination thereof. According to various aspects of palette-based coding, the video coder may code index values indicative of one or more of the pixels of the current block, instead of coding the actual pixel values or their residuals for the current block. In the context of palette-based coding, the index values indicate respective entries in the palette that are used to represent the colors of the individual pixels of the current block.

For example, the video encoder may encode a block of video data by determining a palette for the block, locating an entry in the palette to represent colors of one or more of the pixels of the block, and encoding the block with index values that indicate the entries in the palette. For those pixels of the block with color values that map to entries in the palette, the video encoder may encode the index values of the entries for the respective pixels. For those pixels of the block with color values that do not map to entries in the palette, the video encoder may encode a special index for the pixel and encode the actual pixel value or its residual value (or a quantized version thereof). These pixels are referred to as "escape pixels." In some examples, a palette may include zero entries representing no color values. In this example, all pixels of the block have color values that do not map to entries in the palette and, thus, are encoded as escape pixels.

In some examples, the video encoder may signal the palette, the index values, and any escape pixels in an encoded bitstream. In turn, the video decoder may obtain, from the encoded bitstream, the palette for the block, as well any index values for the pixels of the block, and pixel values for any escape pixels of the block. The video decoder may map the index values to entries of the palette and decode the escape pixels to reconstruct the pixel values of the block. The example above is intended to provide a general description of palette-based coding.

The techniques for palette-based coding of video data may be used with one or more other coding techniques, such as techniques for inter- or intra-predictive coding. For example, as described in greater detail below, a video encoder or video decoder or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a video coding standard developed by the Joint Collaboration Team on Video Coding (JCT-VC) of ITU-T Video Coding Experts Group (VCEG) and ISO/IEC Motion Picture Experts Group (MPEG). The finalized HEVC standard, hereinafter referred to as "HEVC Version 1," is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013, and is available from http://www.itu.int/rec/T-REC-H.265-201304-I.

The Range Extensions to HEVC, namely HEVC-Rext, is being developed by the JCT-VC. A recent Working Draft (WD) of Range Extensions, hereinafter referred to as "REXt WD7," is available from http://phenix.int-evry.fr/jct/doc_end_user/documents/17_Valencia/wg11/JCTVC-Q1005-v4.zip. The JCT-VC is also developing HEVC Screen Content Coding (SCC), which is based on the HEVC-Rext. A recent WD of the HEVC SCC extension, hereinafter referred to as SCC WD1.0, is available from http://phenix.int-evey.fr/jct/doc_end_user/documents/18_Sapporo/wg11/JCTVC-R1005-v3.zip. A more recent WD of the HEVC SCC extension, hereinafter referred to SCC WD2.0, is available from http://phenix.int-evey.fr/jct/doc_end_user/documents/19_Strasbourg/wg11/JCTVC-S1005-v1.zip.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

The basic idea of palette-based coding is that, for each CU, a palette is derived that includes the most dominant colors (i.e., pixel values) in the current CU, or in some cases no colors. The palette size and the palette entries of the palette may be transmitted from a video encoder to a video decoder. The palette size and entries of the palette may be directly coded or predictively coded using the size and entries, respectively, of palettes for one or more neighboring CUs (e.g. above and/or left coded CUs). The pixels of the CU may then be encoded based on the palette according to a certain scanning order.

For each pixel location in the CU, a flag may be transmitted to indicate whether the color of the pixel is included in the palette. For those pixels that map to an entry in the palette, a palette index associated with that entry may be signaled for the given pixel location in the CU. In some cases, run mode coding may be used such that the palette index associated with the pixel location in the CU is signaled followed by a "run" of the pixel value. In this case, neither the flag nor the palette index needs to be transmitted for the following pixel locations that are covered by the "run" as they all have the same pixel value. For those pixels with color values that do not map to entries in the palette (i.e., escape pixels), a special index may be assigned to the pixel and the actual pixel value or its residual value (or a quantized version thereof) may be transmitted for the given pixel location in the CU. The escape pixel values may be quantized according to a slice-level quantization parameter (QP) value or a coefficient QP value. The escape pixels may be coded using any existing entropy coding method such as fixed length coding, unary coding, etc.

Multiple different technical aspects of palette-based coding are described in more detail below, including indicating a palette-based coding mode, determining a palette for a given block, transmitting palette index values used to indicate pixel values of the given block, and lossy coding of the palette and the palette index values.

For example, a syntax element, such as a flag "PLT_Mode_flag" or "palette_mode_flag," may be transmitted to indicate whether a palette-based coding mode is to be used for a current CU (or a PU in other examples). In one example, a value of the syntax element palette_mode_flag may specify that the current CU is encoded using the palette-based coding mode or that the current CU is encoded using a mode other than the palette-based coding mode. For example, any of a variety of inter-predictive, intra-predictive, or other coding modes may be used to decode the current CU. The use of the palette_mode_flag is described for purposes of example. In other examples, other syntax elements such as multi-bit codes may be used to indicate whether the palette-based, inter-predictive, intra-predictor, or another coding mode is to be used for a CU (or PU in other examples).

In some examples, the syntax element indicating the palette-based coding mode may be signaled at the CU-level in an encoded bitstream, and then received by a video decoder upon decoding the encoded bitstream. In other examples, the syntax element may be transmitted at a higher level than the CU-level. For example, a flag indicating the palette-based coding mode may be transmitted at slice-level to indicate whether all of the CUs in the slice are to be encoded using the palette-based coding mode. In other examples, a flag indicating the palette-based coding mode may be signaled at a picture parameter set (PPS), sequence parameter set (SPS) or video parameter set (VPS) level.

In additional examples, a syntax element may be transmitted at one of the higher levels, e.g., SPS, VPS, PPS or slice level, specifying whether the palette-based coding mode is enabled for a particular video sequence, picture or slice, while the palette_mode_flag indicates whether the palette-based coding mode is used for each CU. In one example, if a flag or other syntax element sent at the SPS, VPS, PPS or slice level indicates that the palette-based coding mode is disabled, there may be no need to additionally signal the palette_mode_flag for each CU. Again, as mentioned above, application of these techniques for indicating the palette-based coding mode for a current CU may additionally or alternatively be used to indicate the palette-based coding mode for a PU.

A syntax element or flag indicating the palette-based coding mode may also or alternatively be conditionally transmitted or inferred based on side information. The side information used as conditions for transmitting or inferring the syntax element may be, for example, one or more of the size of a current CU, a frame type, a color space, a color component, a frame size, a frame rate, a layer ID in scalable video coding or a view ID in multi-view coding.

The palette used by a video encoder for palette-based encoding may be transmitted by the video encoder in an encoded bitstream for use by a video decoder for palette-based decoding. A palette may be transmitted for each CU, or possibly shared among different CUs. In one example, a palette may be transmitted separately for each color component of a current CU. For example, there may be a palette for a luma (Y) component of the current CU, another palette for a first chroma (U) component of the current CU, and yet another palette for a second chroma (V) component of the current CU. In the palette for the Y component, each entry in the palette may be a representative luma value in the current CU. In each of the respective palettes for the U and V components, each entry in the palette may be a representative chroma value in the current CU. In another example, a single palette may be transmitted for all of the color components of the current CU. In this example, the i-th entry in the palette may be represented as a triple (Yi, Ui, Vi) that indicates a value for each of the color components. In yet another example, a luma palette may be transmitted for the Y component of the current CU, while a chroma palette may be transmitted for the U and V components of the current CU.

A size of the palette, e.g., in terms of the number of color values included, can be a fixed value or can be signaled by the encoder in an encoded bitstream. In the case that separate palettes are defined for different color components of the current CU, the size of the palette may be signaled separately for each of the different color components or a single size may be signaled for all of the color components. A syntax element defined to indicate the size of the palette may be coded using unary codes, truncated unary codes (e.g., that truncate at a maximum limit of the palette size), exponential-Golomb, or Rice-Golomb codes. In some examples, the size of the palette may be indicated by signaling a "stop" flag after signaling an entry of the palette. The size of the palette may be conditionally transmitted or inferred based on side information.

In some examples, for each CU, a flag may be transmitted to indicate whether a palette for the current CU is predicted or explicitly transmitted. The flag may be transmitted separately for each of the different color components (e.g., three flags may be transmitted for each of the YUV color components), or a single flag may be transmitted for all of the color components. In some examples, a palette of a current CU may be predicted by copying some or all of the entries from predictor palettes of one or more previously coded neighboring CUs. For example, the predictor palette may be the palette of the left neighboring CU or the top neighboring CU. The predictor palette may also be a combination of palettes of two or more neighboring CUs. For example, one or more formulas, functions, rules or the like may be applied to generate the predictor palette based on palettes of two or more of a plurality of neighboring CUs. It is also possible that a candidate list may be constructed, and one or more indexes may be transmitted to indicate one or more candidate CUs from which the palette of the current CU is to be at least partially copied.

In some examples, the palette of the current CU may be predicted on an entry-wise basis. In one example, for each entry in the palette of the current CU, a flag is transmitted to indicate whether the respective entry is to be copied from a corresponding entry in a predictor palette, e.g., of a selected neighboring CU or a combination of one or more neighboring CUs, or is to be explicitly transmitted from the video encoder to the video decoder. In another example, for each entry in a predictor palette of a selected neighboring CU or a combination of one or more neighboring CUs, a flag is transmitted to indicate whether the respective entry is to be copied to the palette of the current CU. The neighboring CU whose palette is used as the predictor palette or the rules for constructing the predictor palette from a combination of two or more neighboring CUs may be conditionally transmitted or inferred based on side information.

An alternative to that approach to explicitly transmitting or predicting the palette is to construct the palette on-the-fly. In this case, at the beginning of the CU, there is no entry in the palette, and as the encoder signals new values of the pixels for the positions in the CU, these values are included in the palette. That is, the encoder adds color values to the palette as they are generated and transmitted for positions in the CU. Then, later positions in the CU that have the same values may refer to color values in the palette, e.g., with index values, instead of having the encoder explicitly transmit the color values. Similarly, when the decoder receives a new color value (e.g., signaled by the encoder) for a position in the CU, it includes the color value in the palette constructed by the decoder. When later positions in the CU have color values that have been added to the palette, the decoder may receive information such as, e.g., index values, that identify the corresponding color values in the palette for reconstruction of the pixels in the CU.

Once the palette for a current CU has been determined, the CU may be coded (i.e., encoded or decoded) by selecting and transmitting index values that map to color values in the palette for one or more pixels within the CU. For example, the i-th entry in an index value map may correspond to the i-th position in the CU. A value of the i-th entry in the index value map equal to 1 may specify that the color value of the pixel at this i-th location in the CU is one of the color values in the palette, and a palette index corresponding to the color value within the palette is further transmitted so that a video decoder can reconstruct the CU. In the case where there is only one entry in the palette, the transmission of palette index may be skipped. A value of the i-th entry in the index value map equal to 0 may specify that the color value of the pixel at the i-th position in the CU is not included in the palette (i.e., the pixel is an escape pixel), and the color value of the escape pixel is explicitly transmitted to the video decoder.

If the color value at one position in the CU is a color value within the palette, it is observed that there is a high probability that the neighboring positions in the CU have the same color value. To take advantage of this probability, after encoding a palette index (e.g., index j corresponding to color value s) for a position in the CU, a syntax element "run" may be transmitted to indicate the number of consecutive pixels having the same color value s that are included in the CU before the scan reaches a different color value. For example, if the immediate next position in the CU has a value different than s, then run=0 is transmitted. If the next position in the CU has value s but the next following position does not have value s, then run=1 is transmitted.

In some cases, where a run is not explicitly transmitted, a value of the run may be implied to be a constant number of positions, e.g., 4, 8, 16, etc., or the implicit value of the run may also be dependent on side information. In some additional cases, wherein an index value map is not explicitly transmitted, a start position for the run may be implicitly derived. For example, the run may only start at certain locations, e.g., the beginning of each row, the beginning of every N rows, depending on a scan direction, or depending on side information. It is also possible that the implicit start position derivation and the implicit run derivation are combined. For example, the value of the run may be implied to be equal to the distance between two neighboring start positions.

In some examples, the index value map may be transmitted by signaling line copying. In the case where a current line of pixels in the CU has the same color values as a previous line of pixels above or to the left within the CU, a video encoder may indicate that the index values for the current line of pixels is to be copied from the index values for the previous line of pixels above or to the left within the index value map. As an example, a previous four lines within the index value map may be stored, and then which previous line is to be copied to the current line and how many entries of that previous line are to copied may be signaled.

A video encoder may perform palette-based coding either losslessly or with some losses when the match between the entries in the palette and the actual color values of pixels in the CU are not be exact. A video decoder may generally apply the same process regardless of the video encoder performs lossless or lossy palette-based coding. In the case of lossy palette-based coding, a quantized palette may be used such that two or more entries with close color values may be merged (i.e. quantized) into a single value in the palette. In one example, a new color value may be added to the palette based on whether an absolute difference between the new color value and each of the existing color values already included in the palette is greater than a threshold. If the absolute difference is less than or equal to the threshold, the new color value may not be added to the palette, and instead is either dropped or merged with an existing color value included in the palette.

Similarly, in another example, a color value of a pixel within a current CU to be encoded may be compared to the color values of each of the entries in the palette. If the absolute difference between the color value of the pixel and one of the entries in the palette is less than or equal to a threshold, the pixel value may be encoded as the index value corresponding to the one of the entries in the palette. In some examples, the palette entry that yields the smallest absolute difference from the color value of the pixel may be selected to encode the pixel. If the absolute difference between the color value of the pixel and all of the entries in the palette is greater than the threshold, the pixel may be encoded as an escape pixel having a color value that is not included in the palette and is instead explicitly transmitted.

In HEVC version 1, after picture reconstruction, a deblocking filter process at a video encoder or a video decoder attempts to detect artifacts at boundaries formed between coded blocks, and to attenuate the artifacts by applying a selected deblocking filter to pixels along the boundary. The video encoder or video decoder may make deblocking filtering decisions separately for each block boundary having a four-pixel length that lies on a grid dividing a picture into blocks of 8×8 pixels or samples.

Figure 4:
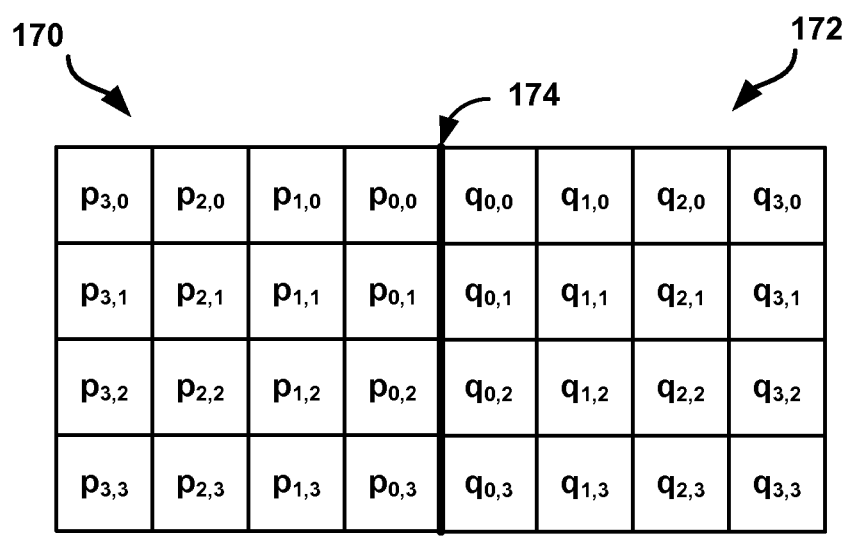
FIG. 4 is a conceptual diagram illustrating an example of a four-pixel long vertical block boundary formed between two adjacent blocks.

FIG. 4 is a conceptual diagram illustrating an example of a four-pixel long vertical block boundary 174 formed between two adjacent blocks 170, 172. For purposes of explanation, a first block 170 may be referred to as block P and a second block 172 may be referred to as block Q. As illustrated in FIG. 4, first block 170 (P) includes 4×4 pixels, each labeled as $p_{j,i}$, with j indicating column numbers 0, 3 starting from block boundary 174, and i indicating row numbers 0, 3 starting from the top of first block 170. As further illustrated in FIG. 4, second block 172 (Q) includes 4×4 pixels, each labeled as $q_{j,i}$, with j indicating column numbers 0-3 starting from block boundary 174, and i indicating row numbers 0-3 starting from the top of second block 172.

As an example, in the case that first block 170 and second block 172 are luma blocks, the video encoder or video decoder may apply deblocking filtering to luma pixels in each of first block 170 and second block 172 along block boundary 174 based on the following three criteria being true: (1) block boundary 174 is a prediction unit (PU) or transform unit (TU) boundary, (2) a boundary strength value for block boundary 174 is greater than zero, and (3) variation of pixels or samples on both sides of block boundary 174 is below a specified threshold. In the case that certain additional conditions, described below, are also true, a strong filter may be applied to the pixels in each of first block 170 and second block 172 along the block boundary 174 instead of a normal or weak deblocking filter.

The boundary strength value, Bs, for block boundary 174 may be determined according to the conditions included in TABLE 1, below.

TABLE 1

Definition of Boundary Strength Values for Block Boundary Formed Between Two Neighboring Luma Blocks

| ID | Conditions | Bs |
|---|---|---|
| 1 | At least one of the blocks is Intra | 2 |
| 2 | At least one of the blocks has non-zero coded residual coefficient and boundary is a transform boundary | 1 |
| 3 | Absolute differences between corresponding spatial motion vector components of the two blocks are >= 1 in units of integer pixels | 1 |
| 4 | Motion-compensated prediction for the two blocks refers to different reference pictures or the number of motion vectors is different for the two blocks | 1 |
| 5 | Otherwise | 0 |

In the case that block boundary 174 is a PU or TU boundary and the boundary strength value, Bs, is positive (i.e., greater than 0), the pixel variation criteria further used by the video encoder or video decoder to determine whether deblocking filtering is enabled for block boundary 174 is as follows, with the pixel values indicated as illustrated in FIG. 4.

$$|p_{2,0}-2p_{1,0}+p_{0,0}|+|p_{2,3}-2p_{1,3}+p_{0,3}|+|q_{2,0}-2q_{1,0}+q_{0,0}|+ |q_{2,3}-2q_{1,3}+q_{0,3}|<\beta \quad (1)$$

Based on the deblocking filtering being enabled for block boundary 174, the additional criteria used by the video encoder or video decoder to determine a type of the deblocking filtering, i.e., normal or strong, is as follows, with the pixel values indicated as illustrated in FIG. 4 and with i=0, 3.

$$|p_{2,i}-2p_{1,i}+p_{0,i}|+|q_{2,i}-2q_{1,i}+q_{0,i}|<\beta/8 \quad (2)$$

$$|p_{3,i}+p_{0,i}|+|q_{3,i}-q_{0,i}|<\beta/8 \quad (3)$$

$$|p_{0,i}-q_{0,i}|<2.5t_c \quad (4)$$

In the case that a strong deblocking filter is selected, the deblocking filter may be applied to three luma pixels on each side of block boundary 174, e.g., $p_{2,i}$, $p_{1,i}$, $p_{0,i}$, $q_{0,i}$, $q_{1,i}$, $q_{2,i}$. In the case that a normal or weak filter is selected, the deblocking filter may be applied to either one or two luma pixels on each side of block boundary 174, e.g., $p_{0,i}$ and $q_{0,i}$; or $p_{1,i}$, $p_{0,i}$, $q_{0,i}$, $q_{1,i}$.

Moreover, in the case that first block 170 and second block 172 are chroma blocks, the video encoder or video decoder may apply deblocking filtering to chroma pixels in each of first block 170 and second block 172 along block boundary 174 based on a boundary strength value for block boundary 174 being equal to 2. Based on the deblocking filtering being enabled for block boundary 174, the deblocking filter may be applied to one chroma pixel on each side of block boundary 174, e.g., $p_{0,i}$ and $q_{0,i}$.

The deblocking filter decisions for horizontal block boundaries may be determined similarly to the vertical block boundaries described above with respect to FIG. 4. Deblocking filtering in HEVC is described in more detail in HEVC Version 1, and A. Norkin, G. Bjø ntegaard, A. Fuldseth, M. Narroschke, M. Ikeda, K. Andersson, M. Zhou, and G. V. der Auwera, "HEVC deblocking filter," IEEE Trans. Cirt. & Sys. Video Technol., vol. 22, no. 12, December 2012.

In HEVC Version 1, after picture reconstruction, a video encoder or a video decoder may apply two different classes of SAO filtering, namely Band Offset (BO) and Edge Offset (EO). In one example, Band Offset filtering may be used to compensate for systematic quantization errors. In this example, the video encoder or video decoder may classify pixel values by their intensity, and signal one starting band position and four offset values in a bitstream to correct pixel values in the consecutive four bands including the starting band.

In another example, Edge Offset filtering may be used to compensate ringing artifacts due to quantization. In this example, the video encoder or video decoder may select one edge offset class out of four candidates (e.g., horizontal, vertical, 45 degree diagonal, and 135 degree diagonal) based on a major ringing artifact direction in a current coding tree unit (CTU). After determining the edge offset class, the video encoder or video decoder may classify pixels in the CTU into five categories based on relative intensities between neighbor pixels along the direction of the selected edge offset class. Four out of the five categories may be associated with applying an offset to reduce the ringing artifacts, and the fifth category may be associated with not applying an offset or disabling the Edge Offset filtering.

In HEVC Version 1, a slice-level quantization parameter (QP) may be used to quantize blocks in a slice of video data. A video encoder or a video decoder may adjust the slice-level QP in order to quantize or inverse quantize a given block included in a current quantization group in at least three different ways. In general, the QP values described in this disclosure may include a luma palette QP value and at least one chroma palette QP value. For example, a QP value may include a $QP_Y$ value for a luma (Y) component, a $QP_{Cb}$ value for a first chroma (Cb or U) component, and a $QP_{Cr}$ value for a second chroma (Cr or V) component.

As a first example, the video encoder or video decoder may adjust the slice-level QP by a delta QP value (sometimes referred to as CuQpDeltaVal) that is signaled at most once per quantization group. Each quantization group may include one or more CUs. A delta QP value may be signaled for a first TU with a coded block flag (CBF) equal to 1. The CBF may be either a luma (Y) CBF or a chroma (Cb or Cr) CBF. In general, a CBF for a TU is set equal to 1 to indicate that the TU includes at least one non-zero coefficient, which may be quantized. A delta QP value, therefore, may only be signaled in the case that a respective TU includes at least one quantized coefficient in the TU.

Signaling the delta QP value may include signaling an absolute level and sign of the delta QP value at a CU-level in a bitstream. In some examples, the absolute level and sign of the delta QP value may be signaled if the delta QP mechanism is enabled for CUs by cu_qp_delta_enabled_flag. The cu_qp_delta_enabled_flag may be signaled in one of a SPS, VPS, PPS, or slice header in the bitstream to indicate whether delta QP values are enabled for CUs such that the absolute level and sign of the delta QP value may be signaled at a TU-level in the bitstream.

A predicted QP value, which may be the slice-level QP value or a previous QP value associated with a block in a previous quantization group, may be adjusted by the delta QP value according to the following equation.

$$Qp_Y = ((qP_{Y\_PRED} + CuQpDeltaVal + 52 + 2*QpBdOffset_Y)\%(52+QpBdOffset_Y)) - QpBdOffset_Y \quad (5)$$

In the above equation, $Qp_Y$ is a variable, $qP_{Y\_PRED}$ is the predicted luma QP value, CuQpDeltaVal is the delta QP value, and $QpBdOffset_Y$ is a luma quantization parameter range offset value that is based on an input bitdepth for luma samples.

As a second example, the video encoder or video decoder may adjust the slice-level QP by a QpBdOffset value to offset the slice-level QP value due to varying input bitdepths. For example, the luma QP value, $Qp'_Y$, may be determined according to the following equation.

$$Qp'_Y = Qp_Y + QpBdOffset_Y \quad (6)$$

In the above equation, $Qp_Y$ is the variable determined in equation (5) and $QpBdOffset_Y$ is the luma quantization parameter range offset value that is based on the input bitdepth for luma samples. The input bitdepths may be different for each of the Y, Cb or Cr components. As described in more detail below, chroma QP values may be determined by further adjusting the luma QP value based at least in part on a chroma quantization parameter range offset value, $QpBdOffset_C$, that is based on the input bitdepth for chroma samples.

In a third example, video encoder or video decoder may determine chroma QP values with respect to the luma QP value based on chroma offset values. The chroma offset values may include PPS level offsets, e.g., pps_cb_qp_offset and pps_cr_qp_offset, and slice level offsets, e.g., slice_cb_qp_offset and slice_cr_qp_offset. The chroma offset values may further include chroma QP offset values, e.g., $CuQpOffset_{Cb}$ and $CuQpOffset_{Cr}$. In some examples, the chroma QP offset values may be signaled if the chroma QP offset mechanism is enabled for CUs by cu_chroma_qp_offset_enabled_flag. The cu_chroma_qp_offset_enabled_flag may be signaled in one of a SPS, VPS, PPS, or slice header in the bitstream to indicate whether chroma QP offset values are enabled for CUs such that the chroma QP offset values may be signaled at a TU-level in the bitstream.

For example, the chroma QP values, $Qp'_{Cb}$ and $Qp'_{Cr}$, may be determined according to the following equations.

$$qPi_{Cb} = Clip3(-QpBdOffset_C, 57, Qp_Y + pps\_cb\_qp\_offset + slice\_cb\_qp\_offset + CuQpOffset_{Cb}) \quad (7)$$

$$qPi_{Cr} = Clip3(-QpBdOffset_C, 57, Qp_Y + pps\_cr\_qp\_offset + slice\_cr\_qp\_offset + CuQpOffset_{Cr}) \quad (8)$$

$$Qp'_{Cb} = qP_{Cb} + QpBdOffset_C \quad (9)$$

$$Qp'_{Cr} = qP_{Cr} + QpBdOffset_C \quad (10)$$

In the above equations, $qPi_{Cb}$ and $qPi_{Cr}$ are indexes used to determine respective variables $qP_{Cb}$ and $qP_{Cr}$, $Qp_Y$ is the variable determined in equation (5), and $QpBdOffset_C$ is the chroma quantization parameter range offset value that is based on the input bitdepth for chroma samples.

The video encoder and video decoder may determine the chroma QP values with respect to the luma QP for high QP values (e.g., above 30) based on a non-linear adjustment that depends on the input chroma format. The non-linear adjustment used to determine a variable $Qp_C$ is specified in TABLE 2 below. As specified in TABLE 2, if ChromaArrayType is equal to 1, the variables $qP_{Cb}$ and $qP_{Cr}$ are set equal to the value of $Qp_C$ based on the index qPi equal to $qPi_{Cb}$ and $qPi_{Cr}$, respectively. The variable ChromaArrayType is set equal to 1 in the case that the color components (i.e., Y, Cb, Cr) are coded together using a specific chroma format, e.g., 4:2:0.

TABLE 2

Specification of $Qp_C$ as Function of qPi for ChromaArrayType = 1

| | qPi | | | | | | | | | | | | | | |
|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | = qPi | 29 | 30 | 31 | 32 | 33 | 33 | 34 | 34 | 35 | 35 | 36 | 36 | 37 | 37 | = qPi − 6 |

The complete process of how the luma quantization parameter value, $Qp'_Y$, and the chroma quantization parameter values, $Qp'_{Cb}$ and $Qp'_{Cr}$, are derived is described in more detail in HEVC Version 1. In some cases, the $Qp_Y$ value may be used as a quantization step for determining the application of deblocking filtering to pixels in a given CU. If the deblocking filtering is applied to pixels in two different CUs, then the average $Qp_Y$ in both CUs may be used for the deblocking filtering determination.

In the case that a current CU is coded as a palette coded block, the in-loop filtering (e.g., deblocking filtering and/or SAO filtering) processes designed for HEVC coding modes may not provide good results for screen content coded using the palette-based coding mode. Conventionally, palette coded blocks were treated the same as inter-coded blocks and, as such, filtering was automatically applied to reconstructed blocks prior to being stored in a decoded picture buffer. It may be desirable to change the in-loop filtering processes according to the signal characteristics associated with the palette-based coding mode. In some examples, this disclosure describes techniques for determining the design and application of in-loop filtering (e.g., deblocking filtering and/or SAO filtering) for pixels of palette coded blocks. More specifically, techniques are described for determining the application of deblocking filtering for pixels along a block boundary formed by at least one palette coded block at a video encoder or a video decoder.

Various examples of determining the design and application of deblocking filtering for pixels of palette coded blocks are described below. Each of the below examples may be used jointly or separately with any of the other examples (unless they are specifically presented as alternate examples). The below examples are described with respect to first block 170, second block 172, and block boundary 174 from FIG. 4.

In one example of the disclosed techniques, in the case that first block 170 adjacent to block boundary 174 is coded using the palette coding mode, a video encoder or a video decoder may apply deblocking filtering in a similar fashion as if first block 170 was coded as a lossless block (i.e., cu_transquant_bypass=1 such that no transform and no quantization is applied to the block). In other words, the disclosed techniques include treating palette coded first block 170 the same as a lossless coded block by disabling deblocking filtering for pixels within the palette coded first block 170 at block boundary 174 formed with second block 172.

As an example, in the case that first block 170 and second block 172 comprise luma blocks, the deblocking filtering may be disabled for first luma pixels within a reconstructed version of first block 170 as follows. The video encoder or video decoder may first determine whether the deblocking filtering is enabled for block boundary 174 formed between the reconstructed first block 170 and a reconstructed version of second block 172. This determination may be based on the three criteria described above with respect to deblocking filtering. Based on the deblocking filtering being enabled for block boundary 174, the video encoder or video decoder may then determine a number of the first luma pixels within the reconstructed first block 170 to be deblocking filtered. As described above, the number of the first luma pixels to be deblocking filtered may depend on the determined type of the deblocking filtering, i.e., normal or strong, to be applied.

Based on the number of the first luma pixels to be deblocking filtered being greater than zero and based on the first block 170 being a palette coded block, the video encoder or video decoder may set the number of the first luma pixels to be deblocking filtered equal to zero in order to disable the deblocking filtering for the first luma pixels within the reconstructed first block 170. This is similar to the way in which deblocking filtering is disabled for luma samples of lossless coded blocks in HEVC Version 1 such that, according to the disclosed techniques, the luma palette coded blocks are treated the same as lossless coded blocks for purposes of deblocking filtering.

As another example, in the case that first block 170 and second block 172 comprise chroma blocks, the deblocking filtering may be disabled for first chroma pixels within the reconstructed first block 170 as follows. The video encoder or video decoder may first determine whether the deblocking filtering is enabled for block boundary 174. As described above, this determination may be based on the boundary strength value for block boundary 174 being equal to two. Based on the deblocking filtering being enabled for block boundary 174, the video encoder or video decoder may then determine deblocking filtered values for one or more of the first chroma pixels within the reconstructed first block 170.

Based on first block 170 being a palette coded block, the video encoder or video decoder may set the deblocking filtered values for the one or more of the first chroma pixels to be equal to original values for the one or more of the first chroma pixels in order to disable the deblocking filtering for the first chroma pixels within the reconstructed first block 170. This is similar to the way in which deblocking filtering is disabled for chroma samples of lossless coded blocks in HEVC Version 1 such that, according to the disclosed techniques, the chroma palette coded blocks are treated the same as lossless coded blocks for purposes of deblocking filtering.

In another example of the disclosed techniques, in the case that first block 170 and second block 172 adjacent to block boundary 174 are both coded using the palette coding mode, the video encoder or video decoder may disable deblocking filtering for pixels in both first block 170 and second block 172 along block boundary 174. In some examples, the deblocking filtering may be disabled for each of first block 170 and second block 172 in the manner described above with respect to disabling deblocking filtering for pixels in first block 170. In other examples, the deblocking filtering may be disabled for each of first block 170 and second block 172 by setting the boundary strength value for block boundary 174 equal to zero. In this way, deblocking filtering is disabled for both luma and chroma pixels in first block 170 and second block 172 along block boundary 174.

In a further example of the disclosed techniques, in the case that first block 170 is coded using the palette coding mode and second block 172 is coded using a non-palette coding mode, e.g., inter-coding mode or intra-coding mode, etc., the video encoder or video decoder may disable deblocking filtering only for pixels in first block 170 along block boundary 174. In this example, the deblocking filtering may be applied to pixels in second block 172 along block boundary 174. As an example, the video encoder or video decoder may determine whether the deblocking filtering is enabled for block boundary 174 formed between the reconstructed first block 170 and the reconstructed second block 172. Based on the deblocking filtering being enabled for block boundary 174, the video encoder or video decoder may determine a type of the deblocking filtering for the second pixels within the reconstructed second block 172, and apply the determined type of the deblocking filtering to one or more of the second pixels within the reconstructed second block 172. The deblocking filtering may be applied to the second pixels within the second reconstructed block 172 without applying the deblocking filtering to the first pixels within the reconstructed first block 170.

In another example of the disclosed techniques, in the case that first block 170 adjacent to block boundary 174 is coded using the palette coding mode, the video encoder or video decoder may disable deblocking filtering for pixels within both first block 170 and second block 172 adjacent to block boundary 174, regardless of the coding mode used to code second block 172. For example, the deblocking filtering may be disabled by setting the boundary strength value for block boundary 174 equal to zero. In this way, deblocking filtering is disabled for both luma and chroma pixels in first block 170 and second block 172 along block boundary 174.

In an additional example of the disclosed techniques, in the case that first block 170 adjacent to block boundary 174 is coded using the palette coding mode, the video encoder or video decoder may determine whether to apply the deblocking filtering to pixels on both sides of block boundary 174 based on the QP value for the palette coded first block 170 being set equal to zero.

In a further example of the disclosed techniques, in the case that only first block 170 is coded using the palette coding mode and second block 172 is coded using a non-palette coding mode, the video encoder or video decoder may set the boundary strength value for block boundary 174 to a positive value (i.e., greater than 0) such that the deblocking filtering may be enabled for pixels on either side of block boundary 174.

In one case of this example, if first block 170 is coded using the palette coding mode and second block 172 is coded using the intra-coding mode, the boundary strength value for block boundary 174 may be set equal to 2. Therefore, rule 1 in TABLE 1, above, still holds in the case of the palette coding mode. In another case of this example, if first block 170 is coded using the palette coding mode and second block 172 is coded using the intra block copy (IntraBC) coding mode, the boundary strength value for block boundary 174 may be set equal to 1. Alternatively, certain restriction may be applied. For example, if a motion vector associated with the IntraBC coded second block 172 has an absolute value that is larger than a threshold (e.g., 1 in units of integer pixels), the boundary strength value may be set equal to 1. Otherwise, the boundary strength value may be set equal to 0.

In a further case of this example, if first block 170 is coded using the palette coding mode and second block 172 is coded using the inter-coding mode, the boundary strength value for block boundary 174 may be set equal to 1. Alternatively, certain restriction may be applied. For example, if a motion vector associated with the inter-coded second block 172 has an absolute value that is larger than a threshold (e.g. 1 in units of integer pixels), the boundary strength value may be set equal to 1. Otherwise, the boundary strength value may be set to 0.

In another example of the disclosed techniques, in the case that only first block 170 (P) is coded using the palette coding mode and second block 172 (Q) is coded using a non-palette coding mode, the pixel variation criteria used by the video encoder or video decoder to determine whether deblocking filtering is enabled for block boundary 174 may be changed from equation (1) above to the following equation.

$$|q_{2,0}-2q_{1,0}+q_{0,0}|+|q_{2,3}-2q_{1,3}+q_{0,3}|<c\cdot\beta \quad (11)$$

In the above equation, c is a constant, e.g., be set equal to 0.5, and $\beta$ is a parameter that depends on the QP value of the non-palette coded second block 172 (Q) only. Alternatively, $\beta$ may depend on the QP values of both first block 170 and second block 172, if the QP value of the palette coded first block 170 (P) is well defined, such as being set equal to zero as in one of the above examples.

Similarly, the additional criteria used by the video encoder or video decoder to determine a type of the deblocking filtering, i.e., normal or strong may be changed from equations (2), (3) and (4) above to the following equations, with i=0, 3.

$$|q_{2,i}-2q_{1,i}+q_{0,i}|<c\cdot\beta/8 \quad (12)$$

$$|q_{3,i}-q_{0,i}|<c\cdot\beta/8 \quad (13)$$

$$|p_{0,i}-q_{0,i}|<c\cdot 2.5 t_c \quad (14)$$

In a further example of the disclosed techniques, the QP values for the palette-based coding mode, which is used to calculate the $\beta$ and $t_c$ parameters used to design the deblocking filtering, be defined as follows. For example, in the case that only first block 170 (P) is coded using the palette coding mode and second block 172 (Q) is coded using a non-palette coding mode, the QP value of the non-palette coded second block 172 (Q) may be assumed to be qpQ, and the QP value of the palette coded first block 170 (P) may be defined as qpP=qpQ+pltQPOffset. The parameter pltQPOffset may be a predefined constant, a value signaled in a SPS, VPS, PPS or slice header, or implicitly derived. In some examples, the parameter pltQPOffset may be a delta QP value. Alternatively, the QP value of the palette coded first block 170 (P), i.e., qpP, may also be derived from the QP values of one or more other neighbor blocks.

In another example of the disclosed techniques, a flag may be signaled in the SPS, VPS, PPS, slice header, CTU, or CU to indicate whether deblocking filtering is used at block boundary 174 adjacent to at least one palette coded block, e.g., first block 170.

Various examples of determining the design and application of SAO filtering for palette coded blocks are described below. Each of the below examples may be used jointly or separately with any of the other examples (unless they are specifically presented as alternate examples).

In one example of the disclosed techniques, in the case that all of the CUs in a CTU are coded using the palette coding mode, a video encoder or video decoder 30 may disable SAO filtering for all of the CUs in the CTU.

In an alternative example of the disclosed techniques, if the percentage of CUs in the CTU that are coded using the palette coding mode is higher than a threshold, the video encoder or video decoder may disable the SAO filtering for all of the CUs in the CTU. The percentage of palette coded CUs in the CTU may be calculated as the number of palette coded pixels over the overall number of pixels in the CTU, or as the number of palette coded CUs over the overall number of CUs in the CTU, or according to some other criteria. In this alternative example, if SAO filtering is enabled in the CTU, it is possible that the palette coded CUs and the non-palette coded CUs may have different SAO filter parameters. For example, the palette coded CUs and the non-palette coded CUs may have different SAO filter types, different SAO filter classes, or different SAO filter offsets. In addition, each of the palette coded CUs may have different SAO filter parameters.

In another example of the disclosed techniques, the SAO filtering process for palette coded blocks may be enhanced as follows. In one case, escape pixels and non-escape pixels in a palette coded block may have different offset values. For example, the SAO filtering may only be applied to escape pixels while non-escape pixels have offset values set equal to zero. As an additional example, only Band Offset filtering may be applied to escape pixels. In some examples, four bands may be corrected by band offset values. In other examples, more or less than four bands may be corrected by band offset values. In another case, because screen content typically has strong horizontal and vertical patterns, Edge Offset filtering may be restricted to only the horizontal and vertical directions.

In a further case, if a transition offset table, e.g., {(index, offset_index)}, is used to determine an offset when a color transition occurs, a transition Edge Offset mode may be applied. In this case, it may be assumed that the reconstructed color index block in the palette coding mode is denoted as INDEX[x] in raster scanning order. If INDEX[x−1] !=INDEX[x], a transition occurs at position [x] and an offset equal to offset_INDEX[x] (if this value exists in the transition offset table) is applied to the reconstructed pixel value at position [x]. The offset may propagate to the following pixels in raster scanning order. In other words, the same offset applies to the pixels at positions [x+1], [x+2], . . . [x+k], until INDEX[x+k] !=INDEX[x]. The transition offset table may be signaled for each palette index or only a subset of the palette indexes. For example, a transition offset may be coded and signaled into the bitstream only for up to the first four palette indexes. If the transition offset for a specific index is not signalled, a default value, e.g., 0, may be used. The three color components (e.g., Y, Cb, Cr) may either share the same offset values or have individual offset values.

In the case that a current CU is coded as a palette coded block, QP values may be used for quantizing escape pixel values of the palette coded block. In some examples, QP values and quantization may also be applied to the coding of new palette entries. Conventionally, the palette coding mode does not include a mechanism to adjust a slice-level QP value for each CU or each quantization group, which may include one or more CUs. A video encoder or video decoder, therefore, must operate at a constant QP to quantize escape pixel values of palette coded blocks. In some examples, this disclosure describes techniques for determining QP values and delta QP values used to quantize escape pixel values of palette coded blocks.

Various examples of determining or deriving palette QP values for palette coded blocks are described below. Each of the below examples may be used jointly or separately with any of the other examples (unless they are specifically presented as alternate examples).

In one example of the disclosed techniques, a video encoder or video decoder may determine a palette QP (or corresponding quantization step size) value for a palette coded block that is adjusted from a predicted QP value. The palette coded block may be included in a current quantization group, which may include one or more other blocks including other palette coded blocks and non-palette coded blocks. The predicted QP value may by the slice-level QP value or a QP value that is associated with a block included in a previous quantization group. The slice-level QP value is the QP value that is used for quantizing blocks within a slice in HEVC Version 1.

For example, instead of using the slice-level QP value for a palette coded block, the video encoder or video decoder may define a palette QP value for the palette coded block as the slice-level QP+pltQPOffest. In other examples, the palette QP value may be derived from a QP value associated with a block in a previous quantization group or associated with a neighboring block in the current quantization group that also includes the palette coded block. The parameter pltQPOffset may be a predefined constant, a value signaled in a SPS, VPS, PPS or slice header, or implicitly derived. In some examples, the parameter pltQPOffset may be a delta QP value.

In another example of the disclosed techniques, the video encoder or video decoder may use two different QP values or corresponding offsets for the palette coded block. In this example, a first pltQPOffset1 may be used to quantize at least a portion of any new palette entries for the palette coded block, and a second pltQPOffset2 may be used to quantize at least a portion of the escape pixels within the palette coded block. Each of pltQPOffset1 and pltQPOffset2 may be a predefined constant, a value signaled in a SPS, VPS, PPS or slice header, or implicitly derived. In some cases, at least one of the pltQPOffset values may indicate that no quantization is used (i.e., the palette coded block is losslessly coded).

In a further example of the disclosed techniques, the video encoder or video decoder may use several different QP values or corresponding offsets for the palette coded block. In this example, a first pltQPOffset1 may be used to quantize any new palette entries until a flag indicates a switch point to start using a second pltQPOffset2 to quantize any additional new palette entries, and so on.

In an additional example of the disclosed techniques, different QP values or corresponding offsets, i.e., pltQPOffsets, may be signaled or predefined for each index value or each subset of index values coded for pixels within the palette coded block. In some cases, a different pltQPOffset may also be used for pixels in each different palette run mode. For example, pixels in a "copy from the left" run mode may have a different QP value than pixels in a "copy from above" run mode. In other case, the pltQPOffset may also depend on the run length.

Various examples of determining delta QP values used to determine or derive palette QP values for palette coded blocks are described below. Each of the below examples may be used jointly or separately with any of the other examples (unless they are specifically presented as alternate examples). Conventionally, the palette coding mode does not include a mechanism to adjust a slice-level QP value for each CU or each quantization group. As described above, for non-palette coded blocks, the slice-level QP value may be adjusted based on a delta QP value signaled once for each CU or each quantization group if the non-palette coded block includes at least one non-zero coefficient, which may be indicated by an associated CBF being equal to 1.

In one example of the disclosed techniques, a video encoder or video decoder may determine whether at least one pixel within a palette coded block is coded as an escape pixel having a color value that is not included in a palette for the palette coded block, and based on the at least one pixel within the palette coded block being coded as an escape pixel, determine a delta QP value for a current quantization group that includes the palette coded block. The video encoder or video decoder may then adjust a predicted QP value based on the delta QP value in order to determine the palette QP value for the palette coded block. The palette coded block may be included in the current quantization group. The predicted QP value may by the slice-level QP value or a QP value that is associated with a block included in a previous quantization group.

For example, a delta QP value (sometimes referred to as CuQpDeltaVal) may be signaled depending on a value of a CU-level escape flag that indicates whether a current CU includes at least one pixel that is coded as an escape pixel value. One example of this CU-level escape flag, i.e., palette_escape_val_present_flag, is described in U.S. application Ser. No. 14/719,215, filed May 21, 2015, which claims the benefit of U.S. Provisional Application No. 62/002,054 filed May 22, 2014. If the CU-level escape flag indicates that the current CU includes at least one escape flag, the delta QP value may be signaled at the CU-level in the bitstream right after the CU-level escape flag. As another example, a delta QP value may be signaled if at least one escape flag is present for a pixel within in a CU coded using the palette coding mode. The delta QP value may be signaled right after the first escape flag is signaled, or at the end of the CU. Signaling the delta QP value may include signaling an absolute level and sign of the delta QP value.

The above example may be used to determine a luma palette QP value used to quantize luma pixels that are coded as escape pixels. In addition, based on the at least one pixel within the palette coded block being coded as an escape pixel, the video encoder and video decoder may determine a chroma QP offset value for the current quantization group that includes the palette coded block, and adjust the luma palette QP value determined for the palette coded block based on the chroma QP offset value in order to determine a chroma palette QP value for the palette coded block.

In another example of the disclosed techniques, a delta QP value may be signaled for each palette coded CU depending on a value of a syntax element that indicates whether delta QP values are enabled for palette coded blocks. In this example, the syntax element may be signaled in one of a SPS, VPS, PPS or slice header to indicate whether delta QP values are signaled at the CU-level for the palette coded blocks. In the case of luma pixels, the delta QP value may be signaled if the delta QP mechanism is enabled for CUs by cu_qp_delta_enabled_flag, signaled in one of a SPS, VPS, PPS, or slice header in the bitstream. In the case of chroma pixels, chroma QP offset values may be signaled if the chroma QP offset mechanism is enabled for CUs by cu_chroma_qp_offset_enabled_flag, signaled in one of a SPS, VPS, PPS, or slice header in the bitstream.

As a further example of the disclosed techniques, a delta QP value may be signaled for a palette coded CU depending on whether at least a portion of the new palette entries are quantized.

Various examples of determining palette QP values for palette coding blocks using a predicted QP value are described below. Each of the below examples may be used jointly or separately with any of the other examples (unless they are specifically presented as alternate examples).

In one example of the disclosed techniques, a video encoder or video decoder may determine whether a palette coded block is a first block in a current quantization group or whether any previous non-palette coded blocks in the current quantization group include non-zero coefficients. Based on the palette coded block being the first block in the current quantization group or none of the previous non-palette coded blocks in the current quantization group including non-zero coefficients, the video encoder or video decoder may determine the palette QP value for the palette coded block adjusted from the predicted QP value, e.g., $qP_{Y\_PRED}$ from equation (5) above. The palette QP value may include luma and chroma QP values, i.e., $Qp_Y$, $Qp'_Y$, $Qp_C$, $Qp'_{Cb}$ and $Qp'_{Cr}$ from equations (6) and (11) and TABLE 2 above, which are used to quantize the escape pixels within the palette coded block.

In this example, in some cases, no delta QP value may be signaled for the palette coded block and may be assumed to be equal to zero. In other cases, the delta QP value may be signaled for the palette coded block and the palette QP value may be determined according to one or more of the techniques described above. In order to derive the palette QP value for the palette coded block from a QP value of a block in a previous neighboring quantization group, the predicted QP may be used. In this respect, the palette coded block may be treated in a similar manner to a non-palette coded TU either with no non-zero coefficients (no delta QP value signaled) or with non-zero coefficients (delta QP value signaled).

Alternatively, based on the palette coded block not being the first block in the current quantization group and at least one of the previous non-palette coded blocks in the current quantization group including non-zero coefficients, the video encoder or video decoder may determine the palette QP value to be equal to a quantization group QP value, including luma and chroma QP values, previously determined for the at least one previous non-palette coded blocks in the current quantization group. In other words, for palette coded blocks in the current quantization group that are coded after at least one TU having non-zero coefficients in the current quantization group, the luma and chroma QP values determined for the quantization group are used for the palette coded blocks. These luma and chroma QP values may be the QP values that are also used for the other non-palette coded TUs in the quantization group.

In the case of luma pixels, a palette delta QP value may be signaled for the palette coded block only if a delta QP value has not been previously determined for a block included in the current quantization group that also includes the palette coded block. This may occur in the case that the palette coded block is a first block in the current quantization group or in the case that no previous non-palette coded blocks in the current quantization group include non-zero coefficients. In one example, a syntax element, e.g., IsCuQp-DeltaCoded, may indicate whether a delta QP value for a luma block has been previously signaled for the current quantization group. In the case that a delta QP value has not been previously determined for the current quantization group, the palette delta QP value for the luma palette coded block is signaled. If the palette delta QP value for the luma palette coded block is not signaled, it may be explicitly derived to be equal to zero.

In the case of chroma pixels, a palette chroma QP offset value may be signaled for the palette coded block only if a chroma QP offset value has not been previously determined for a block included in the current quantization group that also includes the palette coded block. This may occur in the case that the palette coded block is a first block in the current quantization group or in the case that no previous non-palette coded blocks in the current quantization group include non-zero coefficients. In one example, a syntax element, e.g., IsCuChromaQPOffsetCoded, may indicate whether a chroma QP offset value for a chroma block has been previously signaled for the current quantization group. In the case that a chroma QP offset value has not been previously determined for the current quantization group, the palette chroma QP offset value for the chroma palette coded block is signaled. If the palette chroma QP offset value for the chroma palette coded block is not signaled, it may be explicitly derived to be equal to zero.

In general, the palette QP values for palette coded blocks may be determined according to the quantization parameter derivation process described above and in HEVC Version 1, HEVC SCC WD1.0 and HEVC SCC WD2.0. In another example of the disclosed techniques, for a palette coded block, the video encoder or video decoder may switch between determining or deriving palette QP values based on explicitly signaled delta QP values and determining or deriving palette QP values based on the predicted QP value with no delta QP values. This switch may be accomplished via a flag signaled in the SPS, VPS, PPS, or slice header.

Various examples of specifying $Qp_C$ as a function of qPi for palette coded blocks are described below. As illustrated in TABLE 2 above, a QP value used for chroma components may be adjusted non-linearly as a function of the QP value used for luma components. Since the palette-based coding mode has different characteristics for luma and chroma components, the non-linear adjustment may be simplified for the palette-based coding mode. As an example, for palette coded blocks, the variable $Qp_C$ may be set equal to the index qPi.

Various examples of a QP value used to determine application of deblocking filtering for pixels within palette coded blocks are described below. For example, the different QP values and the different adjustments described above may be used as the QP value employed to determine the application of deblocking filtering for palette coded blocks.

Various examples of performing quantization of new palette entries for palette coded blocks are described below. In one example of the disclosed techniques, in the case of a current CU being coded as a palette coded block, new palette entries in a palette for the palette coded block may be quantized. The signaling and the QP values for quantizing the new palette entries may be as follows. In one case, the QP value for new palette entries may be different than the QP value determined for quantizing escape pixel values within the palette coded block. For example, the QP value for new palette entries may be set as an offset from the escape pixel QP value.

In another case, a syntax element, e.g., a flag or position index, may indicate which new entries in the palette for the palette coded block are quantized and which ones are not. For example, the new palette entries may be split into two subsets with the first subset including those new entries that are not quantized (i.e., losslessly coded) and the second subset including those new entries that are quantized. A flag may be signaled after each new palette entry to indicate whether or not it is quantized. Alternatively, a flag may be signaled after each new palette entry that is not quantized, while another flag may be signaled to indicate that a given new palette entry and all subsequent new palette entries are quantized. Several different levels of quantization may be applied to the new palette entries.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, and described in HEVC Version 1. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20.

For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In some examples, video encoder 20 may encode one or more syntax elements indicating a number of consecutive pixels in a given scan order that have the same pixel value. The string of like-valued pixel values may be referred to herein as a "run." In an example for purposes of illustration, if two consecutive pixels in a given scan order have different values, the run is equal to zero. If two consecutive pixels in a given scan order have the same value but the third pixel in the scan order has a different value, the run is equal to one. Video decoder 30 may obtain the syntax elements indicating a run from an encoded bitstream and use the data to determine the number of consecutive pixel locations that have the same index value.

In some examples, video encoder 20 and video decoder 30 may perform line copying for one or more entries of a map of index values. For example, video encoder 20 may indicate that a pixel value for a particular entry in an index map is equal to an entry in a line above the particular entry. Video encoder 20 may also indicate, as a run, the number of indices in the scan order that are equal to the entry in the line above of the particular entry. In this example, video encoder 20 and or video decoder 30 may copy index values from the specified neighboring line and from the specified number of entries for the line of the map currently being coded.

According to the techniques of this disclosure, video encoder 20 and video decoder 30 may determine the design and application of in-loop filtering (e.g., deblocking filtering and/or SAO filtering) for pixels of palette coded blocks. More specifically, video encoder 20 and video decoder 30 may determine the application of deblocking filtering for pixels along a block boundary formed by at least one palette coded block. In addition, video encoder 20 and video decoder 30 may determine QP values and delta QP values used to quantize escape pixel values of palette coded blocks. For example, based on at least one pixel within a palette coded block being coded as an escape pixel, video encoder 20 and video decoder 30 may determine a palette QP value for the palette coded block, the palette QP value being adjusted from a predicted QP value. In particular, in some examples, video encoder 20 and video decoder 30 may be configured to perform techniques of this disclosure that are described in more detail with respect to FIGS. 4-6.

Figure 2:
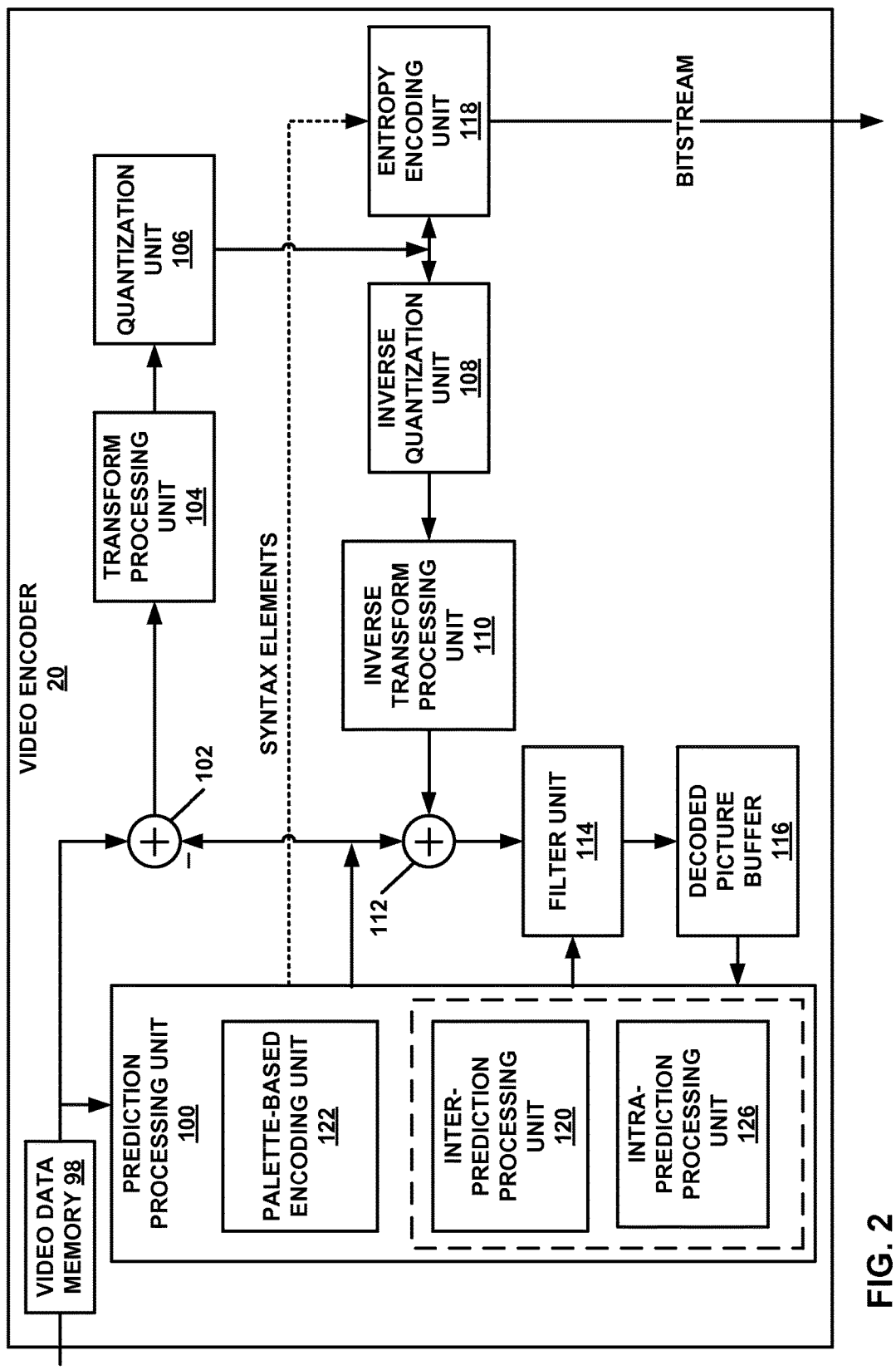
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Video encoder 20, in one example, may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a video data memory 98, a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 98 may store video data to be encoded by the components of video encoder 20. The video data stored in video data memory 98 may be obtained, for example, from video source 18. Decoded picture buffer 116 may be a reference picture memory that stores reference video data for use in encoding video data by video encoder 20, e.g., in intra- or inter-coding modes. Video data memory 98 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 98 and decoded picture buffer 116 may be provided by the same memory device or separate memory devices. In various examples, video data memory 98 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive blocks of the PU based at least in part on actual or interpolated samples at the reference regions indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. Although various functions are described as being performed by palette-based encoding unit 122, some or all of such functions may be performed by other processing units, or a combination of different processing units.

In accordance with the techniques of this disclosure, video encoder 20 may be configured to determine the design and application of in-loop filtering (e.g., deblocking filtering and/or SAO filtering) for pixels of reconstructed palette coded blocks by filter unit 114 prior to storing the reconstructed blocks in decoded picture buffer 116. More specifically, palette-based encoding unit 122 of video encoder 20 may be configured to determine the application of deblocking filtering by filter unit 114 for pixels along a block boundary formed by at least one palette coded block. For example, based on a first block of video data being a palette coded block, palette-based encoding unit 122 may disable deblocking filtering by filter unit 114 for pixels within a reconstructed version of the first block at a block boundary formed between the reconstructed first block and a reconstructed second block of the video data. Palette-based encoding unit 122 may also determine whether or not to apply the deblocking filtering by filter unit 114 for pixels within the reconstructed second block at the block boundary formed between the reconstructed first block and the reconstructed second block. The techniques for determining the application of deblocking filtering of palette coded blocks are described in more detail with respect to FIGS. 4 and 5.

In further accordance with the techniques of this disclosure, video encoder 20 may be configured to determine QP values and delta QP values used by quantization unit 106 to quantize escape pixel values of palette coded blocks. For example, video encoder 20 may be configured to encode a first syntax element in a bitstream indicating whether at least one pixel within a palette coded block is encoded as an escape pixel having a color value that is not included in a palette for the palette coded block. Video encoder 20 may be further configured to, based on the at least one pixel within the palette coded block being encoded as an escape pixel, determine a palette QP value for the palette coded block, the palette QP value being adjusted from a predicted QP value.

In one example, based on the at least one pixel within the palette coded block being encoded as an escape pixel and in the case that a delta QP value has not been previously determined for a current quantization group that includes the palette coded block, video encoder 20 may determine the palette QP value for the palette coded block, determine a palette delta QP value as a difference between the palette QP value and the predicted QP value, and encode a second syntax element in the bitstream indicating the palette delta QP value. Video encoder 20 may then quantize the color value for the escape pixel according to the palette QP value, and encode the quantized color value for the escape pixel in the bitstream. The techniques for determining the palette QP value for a palette coded block are described in more detail with respect to FIG. 6.

Figure 3:
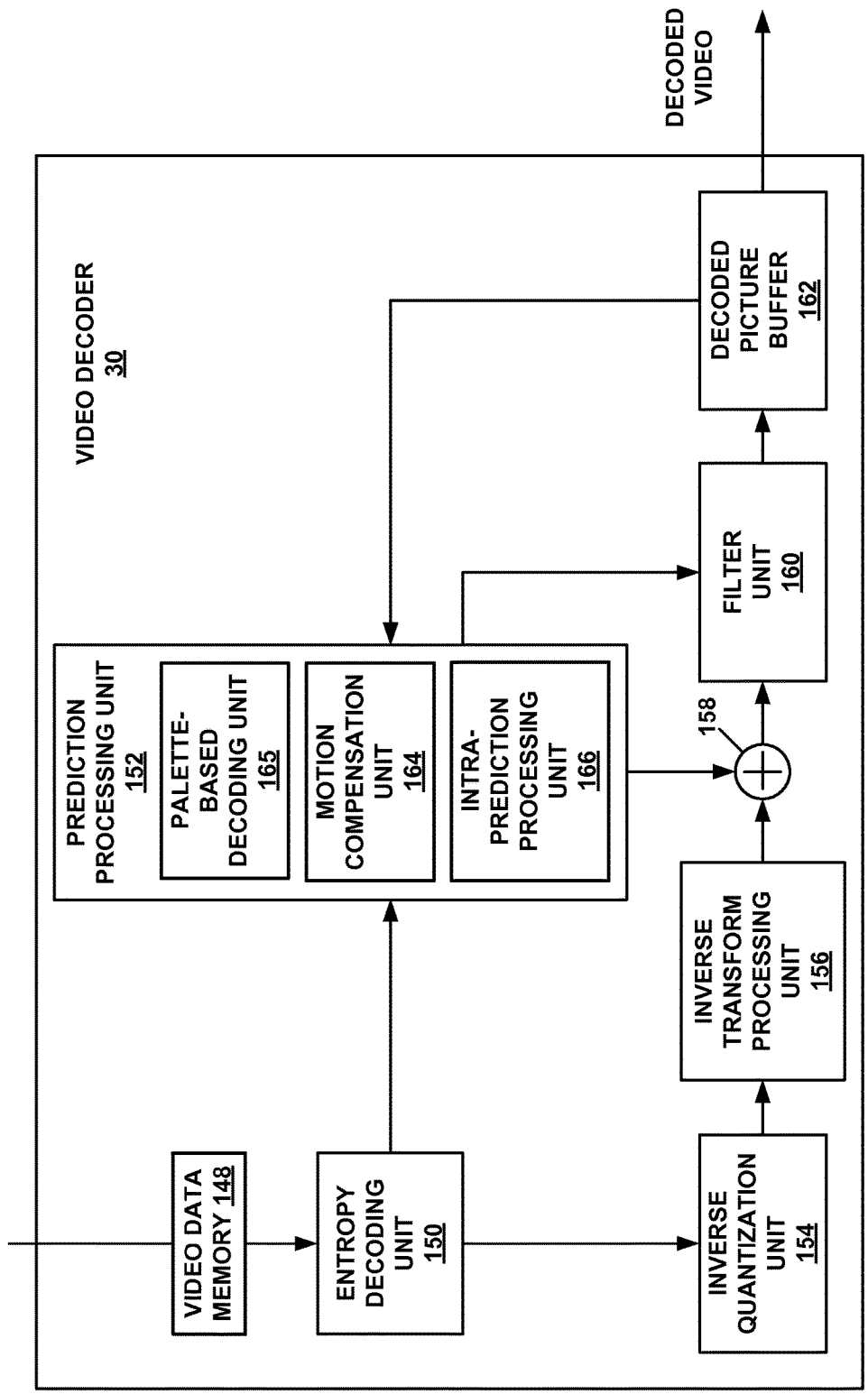
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Video decoder 30, in one example, may be configured to generate a palette having entries indicating pixel values, receive information associating at least some positions of a block of video data with entries in the palette, select pixel values in the palette based on the information, and reconstruct pixel values of the block based on the selected pixel values.

In the example of FIG. 3, video decoder 30 includes a video data memory 148, an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 148 may store video data, such as an encoded video bitstream, to be decoded by the components of video decoder 30. The video data stored in video data memory 148 may be obtained, for example, from computer-readable medium 16, e.g., from a local video source, such as a camera, via wired or wireless network communication of video data, or by accessing physical data storage media. Video data memory 148 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 148 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 148 and decoded picture buffer 162 may be provided by the same memory device or separate memory devices. In various examples, video data memory 148 may be on-chip with other components of video decoder 30, or off-chip relative to those components.

Video data memory 148, i.e., a CPB, may receive and store encoded video data (e.g., NAL units) of a bitstream. Entropy decoding unit 150 may receive encoded video data (e.g., NAL units) from video data memory 148 and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

In accordance with the techniques of this disclosure, video decoder 30 may be configured to determine the design and application of in-loop filtering (e.g., deblocking filtering and/or SAO filtering) for pixels of reconstructed palette coded blocks by filter unit 160 prior to storing the reconstructed blocks in decoded picture buffer 162 or outputting the reconstructed blocks for display. More specifically, palette-based decoding unit 165 of video decoder 30 may be configured to determine the application of deblocking filtering by filter unit 160 for pixels along a block boundary formed by at least one palette coded block. For example, based on a first block of video data being a palette coded block, palette-based decoding unit 165 of may disable deblocking filtering by filter unit 160 for pixels within a reconstructed version of the first block at a block boundary formed between the reconstructed first block and a reconstructed second block of the video data. Palette-based decoding unit 165 of may also determine whether or not to apply the deblocking filtering by filter unit 160 for pixels within the reconstructed second block at the block boundary formed between the reconstructed first block and the reconstructed second block. The techniques for determining the application of deblocking filtering of palette coded blocks are described in more detail with respect to FIGS. 4 and 5.

In further accordance with the techniques of this disclosure, video decoder 30 may be configured to determine QP values and delta QP values used by inverse quantization unit 154 to quantize escape pixel values of palette coded blocks. For example, video decoder 30 may be configured to decode a first syntax element from a received bitstream indicating whether at least one pixel within a palette coded block is to be decoded as an escape pixel having a color value that is not included in a palette for the palette coded block. Video decoder 30 may be further configured to, based on the at least one pixel within the palette coded block being decoded as an escape pixel, determine a palette QP value for the palette coded block, the palette QP value being adjusted from a predicted QP value.

In one example, based on the at least one pixel within the palette coded block being decoded as an escape pixel and in the case that a delta QP value has not been previously determined for a current quantization group that includes the palette coded block, video decoder 30 may decode a second syntax element from the received bitstream indicating a palette delta QP value for the palette coded block, and adjust the predicted QP value based on the palette delta QP value in order to determine the palette QP value for the palette coded block. Video decoder 30 may then decode the quantized color value for the escape pixel from the received bitstream, and inverse quantize the color value for the escape pixel according to the palette QP value. The techniques for determining the palette QP value for a palette coded block are described in more detail with respect to FIG. 6.

Figure 5:
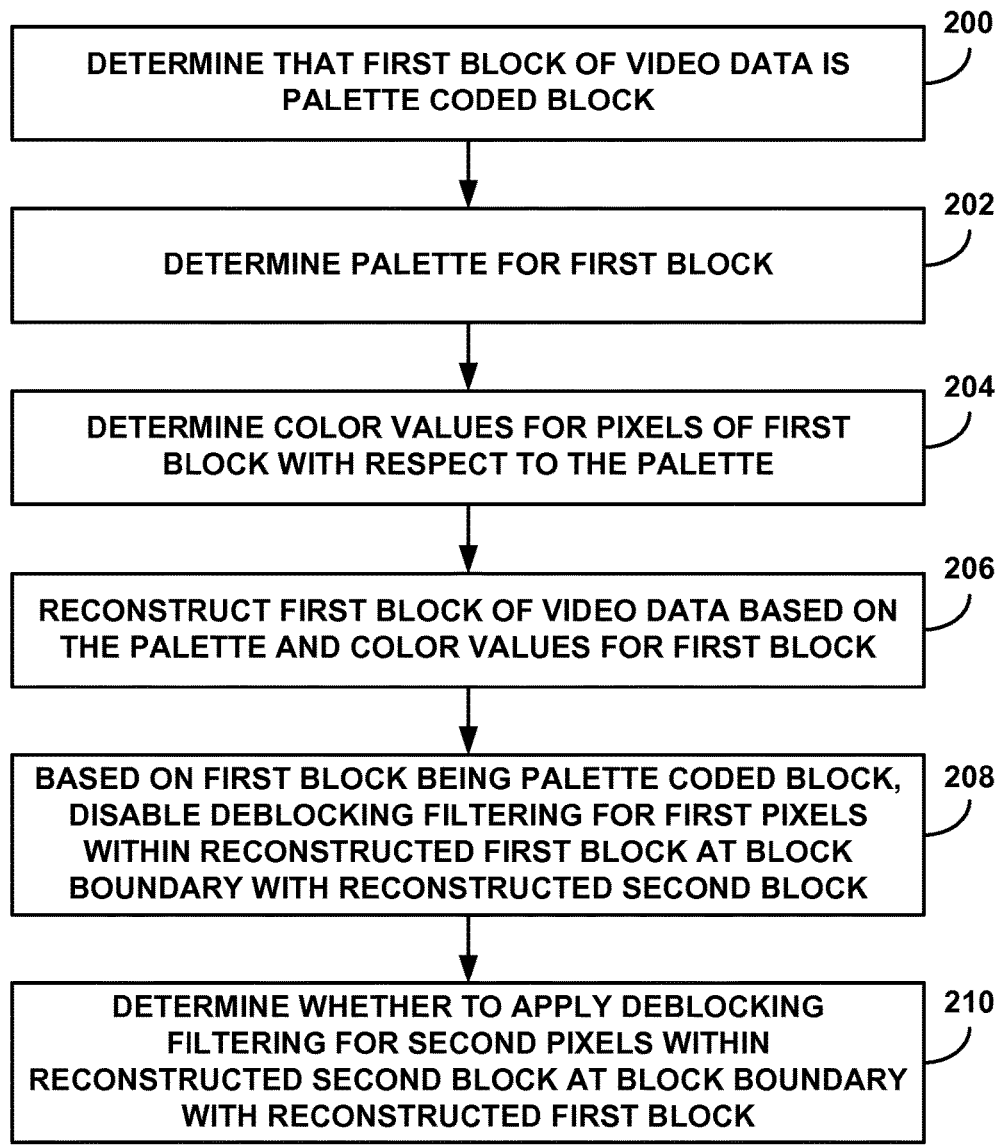
FIG. 5 is a flowchart illustrating an example operation of a video coder determining whether to apply deblocking filtering to pixels along a block boundary formed by at least one palette coded block.

FIG. 5 is a flowchart illustrating an example operation of a video coder determining whether to apply deblocking filtering to pixels along a block boundary formed by at least one palette coded block. The example operation of FIG. 5 is described with respect to applying the deblocking filtering to pixels along block boundary 174 formed between first block 170 and second block 172 from FIG. 4. The example operation illustrated in FIG. 5 may be performed by either video encoder 20 from FIG. 2 or video decoder 30 from FIG. 3.

The example operation of FIG. 5 will first be described with respect to video decoder 30. Video decoder 30 receives an encoded bitstream from a video encoder, such as video encoder 20. The encoded bitstream includes representations of encoded blocks of video data for at least one picture and one or more syntax elements associated with the video data. Video decoder 30 determines that first block 170 of the video data to be decoded is a palette coded block (200). In some examples, video decoder 30 may receive at least one syntax element (e.g., a flag) in the bitstream that indicates whether or not each block of the video data is a palette coded block. In other examples, video decoder 30 may receive one or more syntax elements indicating a type of coding used to code each block of the video data, e.g., whether each block is a palette coded block, an inter-coded block, or an intra-coded block, etc.

When first block 170 is a palette coded block, palette-based decoding unit 165 of video decoder 30 determines a palette for first block 170 (202). The palette for first block 170 includes zero or more palette entries that indicate one or more respective color values. As described in more detail above, the respective color values included in the palette may be the major color values that occur most frequently in first block 170. Palette-based decoding unit 165 may determine the palette according to a palette size and palette entries received in the encoded bitstream. Palette-based decoding unit 165 then determines color value for pixels of first block 170 with respect to the palette (204).

In the case that the palette includes zero palette entries, all of the pixels within first block 170 are to be decoded as escape pixels having color values that are not included in the palette, and palette-based decoding unit 165 determines the color values for the escape pixels received in the encoded bitstream. In the case that the palette includes one or more palette entries, palette-based decoding unit 165 determines index values for one or more pixels within first block 170 received in the encoded bitstream, each of the index values corresponding to one of the palette entries that indicates a color value for one of the pixels within first block 170, and determines color values for any of the pixels within the first block that are decoded as escape pixels.

Video decoder 30 reconstructs first block 170 of the video data based on the determined palette and the determined color values for first block 170 (206). Video decoder 30 may then store the video data of the reconstructed first block 170 in decoded picture buffer 162 and subsequently output the video data of the reconstructed first block 170 for display.

Conventionally, palette coded blocks were treated the same as inter-coded blocks and, as such, filtering was automatically applied to the reconstructed blocks prior to being stored in the decoded picture buffer or output for display. According to the disclosed techniques, the palette coded blocks are instead treated in a similar fashion as lossless coded blocks for purposes of deblocking filtering. In other words, the disclosed techniques include disabling deblocking filtering for pixels within palette coded blocks.

Based on first block 170 being a palette coded block, palette-based decoding unit 165 disables the deblocking filtering for first pixels within the reconstructed first block 170 at block boundary 174 formed between the reconstructed first block 170 and the reconstructed second block 172 (208). In this way, no deblocking filtering may be applied to the first pixels in the reconstructed first block 170 prior to storing or outputting the reconstructed first block 170.

In the case that the reconstructed first block 170 and the reconstructed second block 172 comprise luma blocks, palette-based decoding unit 165 may disable the deblocking filtering for the first luma pixels within the reconstructed first block 170 as follows. Palette-based decoding unit 165 may first determine whether the deblocking filtering is enabled for block boundary 174 formed between the reconstructed first block 170 and the reconstructed second block 172. This determination may be based on block boundary 174 being a PU or TU boundary, a boundary strength value for block boundary 174 being greater than zero, and variation of the first and second luma pixels along both sides of block boundary 174 being below a threshold.

Based on the deblocking filtering being enabled for block boundary 174, palette-based decoding unit 165 may then determine a number of the first luma pixels within the reconstructed first block 170 to be deblocking filtered. The number of the first luma pixels to be deblocking filtered may depend on whether strong or normal deblocking filtering is to be applied to the first luma pixels and, in the case of normal deblocking filtering, a strength of the normal deblocking filtering to be applied to the first luma pixels. Based on the number of the first luma pixels to be deblocking filtered being greater than zero and based on the first block 170 being a palette coded block, palette-based decoding unit 165 may set the number of the first luma pixels to be deblocking filtered equal to zero in order to disable the deblocking filtering for the first luma pixels within the reconstructed first block 170. This is similar to the way in which deblocking filtering is disabled for luma samples of lossless coded blocks in HEVC Version 1 such that, according to the disclosed techniques, the palette coded blocks are treated the same as lossless coded blocks for purposes of deblocking filtering.

In the case that the reconstructed first block 170 and the reconstructed second block 172 comprise chroma blocks, palette-based decoding unit 165 may disable the deblocking filtering for the first chroma pixels within the reconstructed first block 170 as follows. Palette-based decoding unit 165 may first determine whether the deblocking filtering is enabled for block boundary 174 formed between the reconstructed first block 170 and the reconstructed second block 172. This determination may be based on a boundary strength value for block boundary 174 being equal to two. Based on the deblocking filtering being enabled for block boundary 174, palette-based decoding unit 165 may then determine deblocking filtered values for one or more of the first chroma pixels within the reconstructed first block 170. Based on first block 170 being a palette coded block, palette-based decoding unit 165 may set the deblocking filtered values for the one or more of the first chroma pixels to be equal to original values for the one or more of the first chroma pixels in order to disable the deblocking filtering for the first chroma pixels within the reconstructed first block 170. This is similar to the way in which deblocking filtering is disabled for chroma samples of lossless coded blocks in HEVC Version 1 such that, according to the disclosed techniques, the palette coded blocks are treated the same as lossless coded blocks for purposes of deblocking filtering.

In addition, palette-based decoding unit 165 determines whether to apply the deblocking filtering for second pixels within the reconstructed second block 172 at block boundary 174 formed between the reconstructed first block 170 and the reconstructed second block 172 (210). In one example, palette-based decoding unit 165 may determine that second block 172 is also a palette coded block. After reconstructing second block 172, based on second block 172 being a palette coded block, palette-based decoding unit 165 disables the deblocking filtering for the second pixels within the reconstructed second block 172 at block boundary 174 formed between the reconstructed first block 170 and the reconstructed second block 172. In this way, no deblocking filtering may be applied to the second pixels in the reconstructed second block 172 prior to storing or outputting the reconstructed second block 172.

In another example, palette-based decoding unit 165 may determine that second block 172 is not a palette coded block, but is an inter-coded block or an intra-coded block, etc. After reconstructing second block 172, palette-based decoding unit 165 determines whether the deblocking filtering is enabled for block boundary 174 formed between the reconstructed first block 170 and the reconstructed second block 172. Based on the deblocking filtering being enabled for block boundary 174, palette-based decoding unit 165 determines a type of the deblocking filtering for the second pixels within the reconstructed second block 172, and applies the determined type of the deblocking filtering to one or more of the second pixels within the reconstructed second block 172, without applying the deblocking filtering to the first pixels within the reconstructed first block 170. In this way, deblocking filtering may be applied to the second pixels in the reconstructed second block 172 prior to storing or outputting the reconstructed second block 172.

The example operation of FIG. 5 will now be described with respect to video encoder 20. Video encoder 20 determines that first block 170 of the video data is to be encoded as a palette coded block (200). In some examples, video encoder 20 may signal at least one syntax element (e.g., a flag) in an encoded bitstream that indicates whether or not each block of the video data is a palette coded block. In other examples, video encoder 20 may signal one or more syntax elements in the encoded bitstream indicating a type of coding used to code each block of the video data, e.g., whether each block is a palette coded block, an inter-coded block, or an intra-coded block, etc.

When first block 170 is to be encoded as a palette coded block, palette-based encoding unit 122 of video encoder 20 determines a palette for first block 170 (202). The palette for first block 170 includes zero or more palette entries that indicate one or more respective color values. As described in more detail above, the respective color values included in the palette may be the major color values that occur most frequently in first block 170. Palette-based encoding unit 122 may determine a palette size and palette entries of the palette using a pixel value clustering method.

After determining the palette, palette-based encoding unit 122 determines color values for pixels of first block 170 with respect to the palette (204). In the case that the palette includes zero palette entries, all of the pixels within first block 170 are encoded as escape pixels having color values that are not included in the palette, and palette-based encoding unit 122 encodes the escape pixels in the encoded bitstream. In the case that the palette includes one or more palette entries, palette-based encoding unit 122 encodes index values for one or more pixels within first block 170 in the encoded bitstream, each of the index values corresponding to one of the palette entries that indicates a color value for one of the pixels within first block 170, and encodes color values for any of the pixels within the first block that are encoded as escape pixels.

Video encoder 20 may signal the palette and the color values for first block 170 in the encoded bitstream to a video decoder, such as video decoder 30. Video encoder 20 then reconstructs first block 170 of the video data based on the determined palette and the determined color values for first block 170 in a decoding loop (206). Video encoder 20 may then store the video data of the reconstructed first block 170 in decoded picture buffer 116.

According to the disclosed techniques, based on first block 170 being a palette coded block, palette-based encoding unit 122 disables the deblocking filtering for first pixels within the reconstructed first block 170 at block boundary 174 formed between the reconstructed first block 170 and the reconstructed second block 172 (208). In this way, no deblocking filtering may be applied to the first pixels in the reconstructed first block 170 prior to storing the reconstructed first block 170 in decoded picture buffer 116. In addition, palette-based encoding unit 122 determines whether to apply the deblocking filtering for second pixels within the reconstructed second block 172 at block boundary 174 formed between the reconstructed first block 170 and the reconstructed second block 172 (210). This determination may be based, at least in part, on whether second block 172 is a palette coded block, an inter-coded block, or an intra-coded block, etc.

Figure 6:
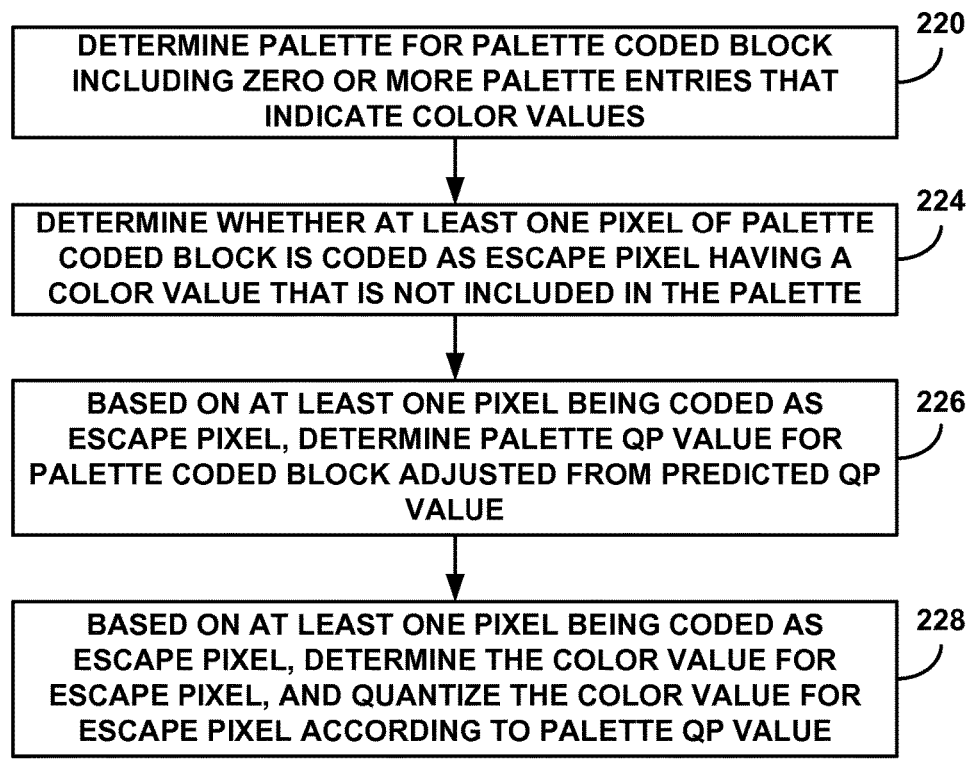
FIG. 6 is a flowchart illustrating an example operation of a video coder determining a palette quantization parameter (QP) value used to quantize escape pixel values of a palette coded block.

FIG. 6 is a flowchart illustrating an example operation of a video coder determining a palette QP value used to quantize escape pixel values of a palette coded block. The example operation illustrated in FIG. 5 may be performed by either video encoder 20 from FIG. 2 or video decoder 30 from FIG. 3.

The example operation of FIG. 6 will first be described with respect to video decoder 30. Video decoder 30 receives an encoded bitstream from a video encoder, such as video encoder 20. The encoded bitstream includes representations of encoded blocks of video data for at least one picture and one or more syntax elements associated with the video data. In some examples, video decoder 30 may receive at least one syntax element (e.g., a flag) in the bitstream that indicates whether or not each block of the video data is a palette coded block. In other examples, video decoder 30 may receive one or more syntax elements indicating a type of coding used to code each block of the video data, e.g., whether each block is a palette coded block, an inter-coded block, or an intra-coded block, etc.

When a current block to be decoded is a palette coded block, palette-based decoding unit 165 of video decoder 30 determines a palette for the palette coded block where the palette includes zero or more palette entries that indicate one or more respective color values (220). Palette-based decoding unit 165 determines whether at least one pixel within the palette coded block is to be decoded as an escape pixel having a color value that is not included in the palette (224). In some examples, video decoder 30 may receive at least one syntax element (e.g., a flag) at a CU-level in the bitstream that indicates whether or not the palette coded block includes at least one escape pixel. In other examples, video decoder 30 may receive a syntax element (e.g., a flag) for each pixel within the palette coded block that indicates whether the pixel is to be decoded based on the palette or as an escape pixel.

In some examples, video decoder 30 may also receive a syntax element in the bitstream that indicates a slice-level QP value. The slice-level QP value is the QP value that is used for quantizing blocks within a slice in HEVC Version 1. For non-palette coded blocks, the slice-level QP value may be adjusted based on a delta QP value, which may be signaled once for each CU or once for each quantization group that includes multiple CUs. The delta QP may be signed for a given non-palette coded block in the case that the non-palette coded block includes at least one non-zero coefficient. Conventionally, the palette-based coding mode does not include a mechanism to adjust the slice-level QP value for each CU or each quantization group such that video decoder 30 must operate at a constant QP to inverse quantize escape pixel values of palette coded blocks.

According to the techniques of this disclosure, based on the at least one pixel within the palette coded block being decoded as an escape pixel, video decoder 30 determines a palette QP value for the palette coded block, the palette QP value being adjusted from a predicted QP value (226). The palette coded block may be included in a current quantization group, which may include one or more other blocks including other palette coded blocks and non-palette coded blocks. In some examples, the predicted QP value that is adjusted to determine the palette QP value may be the slice-level QP value. In other examples, the predicted QP value that is adjusted to determine the palette QP value may be a QP value that is associated with a block included in a previous quantization group. Although primarily described in this disclosure as a singular palette QP value, the palette QP value may include a luma palette QP value and at least one chroma palette QP value. For example, the palette QP value may include a palette $QP_Y$ value, a palette $QP_{Cb}$ value, and a palette $QP_{Cr}$ value.

In one example, based on the at least one pixel within the palette coded block being decoded as an escape pixel, video decoder 30 may determine a delta QP value for the current quantization group that includes the palette coded block, and adjust the predicted QP value based on the delta QP value in order to determine the palette QP value for the palette coded block.

In some cases, based on the at least one pixel within the palette coded block being decoded as an escape pixel and in the case that a delta QP value has not been previously determined for a block included in the current quantization group that also includes the palette coded block, video decoder 30 may receive a syntax element that indicates a palette delta QP value for the palette coded block, and adjust the predicted QP value based on the palette delta QP value in order to determine the palette QP value for the palette coded block. In other cases, based on the at least one pixel within the palette coded block being decoded as an escape pixel and in the case that a delta QP value has been previously determined for a block included in the current quantization group, video decoder 30 may adjust the predicted QP value based on the previously determined delta QP value in order to determine the palette QP value for the palette coded block without receiving a delta QP value for the palette coded block.

In some examples, video decoder 30 may receive the syntax element indicating the palette delta QP value for the palette coded block only if delta QP values are enabled for palette coded blocks. For example, video decoder 30 may receive a syntax element in one of a SPS, VPS, PPS or slice header that indicates whether delta QP values are signaled at the CU-level for palette coded blocks.

The above examples may be used to determine a luma palette QP value used to quantize luma pixels that are decoded as escape pixels. In addition, based on the at least one pixel within the palette coded block being decoded as an escape pixel, video decoder 30 may determining a chroma QP offset value for the current quantization group that includes the palette coded block, and adjust the luma palette QP value determined for the palette coded block based on the chroma QP offset value in order to determine a chroma palette QP value for the palette coded block.

In some cases, based on the at least one pixel within the palette coded block being decoded as an escape pixel and in the case that a chroma QP offset value has not been previously determined for a block included in the current quantization group that also includes the palette coded block, video decoder 30 may receive a syntax element that indicates a palette chroma QP offset value for the palette coded block, and adjust the luma palette QP value based on the palette chroma QP offset value in order to determine the chroma palette QP value for the palette coded block. In other cases, based on the at least one pixel within the palette coded block being decoded as an escape pixel and in the case that a chroma QP offset value has been previously determined for a block included in the current quantization group, video decoder 30 may adjust the luma palette QP value based on the previously determined chroma QP offset value in order to determine the chroma palette QP value for the palette coded block without receiving a chroma QP offset value for the palette coded block In some examples, video decoder 30 may receive the syntax element indicating the palette chroma QP offset value for the palette coded block only if chroma QP offset values are enabled for palette coded blocks. For example, video decoder 30 may receive a syntax element in one of a SPS, VPS, PPS or slice header that indicates whether chroma QP offset values are signaled at the CU-level for palette coded blocks.

As another example, in order to determine the palette QP value for the palette coded block, video decoder 30 may be configured to determine whether the palette coded block is a first block in the current quantization group or whether any previous non-palette coded blocks in the current quantization group include non-zero coefficients. Based on the palette coded block being the first block in the current quantization group or none of the previous non-palette coded blocks in the current quantization group including non-zero coefficients, video decoder 30 may determine the palette QP value, including luma and chroma QP values, adjusted from the predicted QP value. Alternatively, based on the palette coded block not being the first block in the current quantization group and at least one of the previous non-palette coded blocks in the current quantization group including non-zero coefficients, video decoder 30 may determine the palette QP value to be equal to a quantization group QP value, including luma and chroma QP values, previously determined for the at least one previous non-palette coded blocks in the current quantization group.

Furthermore, based on the at least one pixel within the palette coded block being decoded as an escape pixel and upon determining the palette QP value for the palette coded block, video decoder 30 determines the color value for the escape pixel that is not included in the palette, and quantizes the color value for the escape pixel according to the palette QP value (228). More specifically, video decoder 30 decodes from the received bitstream a quantized color value for the escape pixel, and inverse quantizes the color value for the escape pixel according to the palette QP value.

Video decoder 30 then reconstructs the palette coded block of the video data based on the determined palette, the determined index values, and the inverse quantized color values of escape pixels for the palette coded block. For example, video decoder 30 may map the determined index values to entries of the palette to reconstruct the pixel values of the palette coded block. Video decoder 30 may then store the video data of the reconstructed palette coded block in decoded picture buffer 162 and subsequently output the video data of the reconstructed palette coded block for display.

The example operation of FIG. 6 will now be described with respect to video encoder 20. Video encoder 20 may signal at least one syntax element (e.g., a flag) in an encoded bitstream that indicates whether or not each block of the video data is a palette coded block. In other examples, video encoder 20 may signal one or more syntax elements in the encoded bitstream indicating a type of coding used to code each block of the video data, e.g., whether each block is a palette coded block, an inter-coded block, or an intra-coded block, etc.

When a current block is to be encoded as a palette coded block, palette-based encoding unit 122 of video encoder 20 determines a palette for the palette coded block where the palette includes zero or more palette entries that indicate one or more respective color values (220). Palette-based encoding unit 122 determines whether at least one pixel within the palette coded block is encoded as an escape pixel having a color value that is not included in the palette (224). In some examples, video encoder 20 may signal at least one syntax element (e.g., a flag) at a CU-level in the bitstream that indicates whether or not the palette coded block includes at least one escape pixel. In other examples, video encoder 20 may signal a syntax element (e.g., a flag) for each pixel within the palette coded block that indicates whether the pixel is encoded based on the palette or as an escape pixel. In some examples, video encoder 20 may also signal a syntax element in the bitstream that indicates a slice-level QP value.

According to the techniques of this disclosure, based on the at least one pixel within the palette coded block being encoded as an escape pixel, video encoder 20 determines a palette QP value for the palette coded block, the palette QP value being adjusted from a predicted QP value (226). The palette coded block may be included in a current quantization group, which may include one or more other blocks including other palette coded blocks and non-palette coded blocks. The predicted QP value that is adjusted to determine the palette QP value may be the slice-level QP value or a QP value that is associated with a block included in a previous quantization group. The palette QP value may include a luma palette QP value and at least one chroma palette QP value.

In one example, based on the at least one pixel within the palette coded block being encoded as an escape pixel, video encoder 20 may determine a delta QP value for the current quantization group that includes the palette coded block, and adjust the predicted QP value based on the delta QP value in order to determine the palette QP value for the palette coded block.

In some cases, based on the at least one pixel within the palette coded block being encoded as an escape pixel and in the case that a delta QP value has not been previously determined for a block included in the current quantization group that also includes the palette coded block, video encoder 20 may determine the palette QP value for the palette coded block, determine a palette delta QP value as a difference between the palette QP value and the predicted QP value, and signal a syntax element that indicates the palette delta QP value for the palette coded block. In other cases, based on the at least one pixel within the palette coded block being encoded as an escape pixel and in the case that a delta QP value has been previously determined for a block included in the current quantization group, video encoder 20 may adjust the predicted QP value based on the previously determined delta QP value in order to determine the palette QP value for the palette coded block without signaling a delta QP value for the palette coded block.

In another example, in order to determine the palette QP value for the palette coded block, video encoder 20 may be configured to determine whether the palette coded block is a first block in the current quantization group or whether any previous non-palette coded blocks in the current quantization group include non-zero coefficients. Based on the palette coded block being the first block in the current quantization group or none of the previous non-palette coded blocks in the current quantization group including non-zero coefficients, video encoder 20 may determine the palette QP value, including luma and chroma QP values, adjusted from the predicted QP value. Alternatively, based on the palette coded block not being the first block in the current quantization group and at least one of the previous non-palette coded blocks in the current quantization group including non-zero coefficients, video encoder 20 may determine the palette QP value to be equal to a quantization group QP value, including luma and chroma QP values, previously determined for the at least one previous non-palette coded blocks in the current quantization group.

Based on the at least one pixel within the palette coded block being encoded as an escape pixel and upon determining the palette QP value for the palette coded block, video encoder 20 determines the color value for the escape pixel that is not included in the palette, and quantizes the color value for the escape pixel according to the palette QP value (228). More specifically, video encoder 20 quantizes the color value for the escape pixel according to the palette QP value, and encodes in the bitstream the quantized color value for the escape pixel.

Video encoder 20 then reconstructs the palette coded block of the video data based on the determined palette, the determined index values, and inverse quantized color values of escape pixels for the palette coded block in a decoding loop. For example, video encoder 20 may map the determined index values to entries of the palette to reconstruct the pixel values of the palette coded block. Video encoder 20 may then store the video data of the reconstructed palette coded block in decoded picture buffer 116.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to HEVC Version 1 and HEVC SCC WD1.0 and WD2.0 for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
 determining a palette for a palette coded block including zero or more palette entries that indicate one or more respective color values;
 decoding, from a received bitstream, an indication that at least one pixel within the palette coded block is to be decoded as an escape pixel having a color value that is not included in the palette; and
 based on the at least one pixel within the palette coded block being decoded as an escape pixel;
  determining a palette quantization parameter (QP) value for the palette coded block, the palette QP value being adjusted from a predicted QP value,
  decoding, from the received bitstream, a quantized color value for the escape pixel, and
  inverse quantizing the color value for the escape pixel according to the palette QP value.

2. The method of claim 1, wherein the palette QP value comprises a luma palette QP value and at least one chroma palette QP value.

3. The method of claim 1, wherein the palette coded block is included in a current quantization group, and wherein the predicted QP value comprises one of a slice-level QP value or a QP value associated with a block included in a previous quantization group.

4. The method of claim 1, wherein determining the palette QP value comprises:
 determining a delta QP value for a current quantization group that includes the palette coded block; and
 adjusting the predicted QP value based on the delta QP value in order to determine the palette QP value for the palette coded block.

5. The method of claim 1, wherein the palette coded block is a first palette coded block, and wherein determining the palette QP value comprises:
 based on a delta QP value being previously determined for a current quantization group that includes the first palette coded block, adjusting the predicted QP value based on the previously determined delta QP value in order to determine the palette QP value for the first palette coded block; and
 based on a delta QP value not being previously determined for a current quantization group that includes a second palette coded block, determining a palette delta QP value for the second palette coded block, and adjusting the predicted QP value based on the palette delta QP value in order to determine the palette QP value for the second palette coded block.

6. The method of claim 5, wherein determining the palette delta QP value for the second palette coded block comprises:
 determining whether delta QP values are enabled for palette coded blocks; and
 based on delta QP values being enabled for palette coded blocks, determining the palette delta QP value for the second palette coded block.

7. The method of claim 1, wherein the palette QP value comprises a luma palette QP value, the method further comprising:
 based on the at least one pixel within the palette coded block being decoded as an escape pixel, determining a chroma QP offset value for a current quantization group that includes the palette coded block; and
 adjusting the luma palette QP value determined for the palette coded block based on the chroma QP offset value in order to determine a chroma palette QP value for the palette coded block.

8. The method of claim 1, wherein the palette coded block is a first palette coded block, and wherein the palette QP value comprises a luma palette QP value, the method further comprising:
 based on the at least one pixel within the palette coded block being decoded as an escape pixel and a chroma QP offset value being previously determined for a current quantization group that includes the first palette coded block, adjusting the luma palette QP value determined for the first palette coded block based on the previously determined chroma QP offset value in order to determine a chroma palette QP value for the first palette coded block; and
 based on the at least one pixel within the palette coded block being decoded as an escape pixel and a chroma QP offset value not being previously determined for a current quantization group that includes a second palette coded block, determining a palette chroma QP offset value for the second palette coded block, and adjusting the luma palette QP value determined for the second palette coded block based on the palette chroma QP offset value in order to determine the chroma palette QP value for the second palette coded block.

9. The method of claim 8, wherein determining the palette chroma QP offset value for the second palette coded block comprises:
 determining whether chroma QP offset values are enabled for palette coded blocks; and
 based on chroma QP offset values being enabled for palette coded blocks, determining the palette chroma QP offset value for the second palette coded block.

10. The method of claim 1, wherein determining the palette QP value comprises:
 determining whether the palette coded block is a first block in a current quantization group or whether any previous non-palette coded blocks in the current quantization group include non-zero coefficients;
 based on the palette coded block being the first block in the current quantization group or none of the previous non-palette coded blocks in the current quantization group including non-zero coefficients, determining the palette QP value adjusted from the predicted QP value, the palette QP value including luma and chroma palette QP values; and based on the palette coded block not being the first block in the current quantization group and at least one of the previous non-palette coded blocks in the current quantization group including non-zero coefficients, determining the palette QP value to be equal to a quantization group QP value previously determined for the at least one previous non-palette coded blocks in the current quantization group, the quantization group QP value including luma and chroma QP values.

11. The method of claim 1,
wherein decoding the indication comprises decoding a first syntax element from the received bitstream indicating whether the at least one pixel within the palette coded block is to be decoded as an escape pixel; and
wherein, based on the at least one pixel within the palette coded block being decoded as an escape pixel, determining the palette QP value comprises:
in the case that a delta QP value has not been previously determined for a block included in a current quantization group that also includes the palette coded block, decoding a second syntax element from the received bitstream indicating a palette delta QP value for the palette coded block, and adjusting the predicted QP value based on the palette delta QP value in order to determine the palette QP value for the palette coded block; and
in the case that a delta QP value has been previously determined for a block included in the current quantization group, adjusting the predicted QP value based on the previously determined delta QP value in order to determine the palette QP value for the palette coded block without decoding a delta QP value for the palette coded block.

12. A video decoding device comprising:
a memory configured to store video data; and
one or more processors in communication with the memory and configured to:
determine a palette for a palette coded block including zero or more palette entries that indicate one or more respective color values;
decode, from a received bitstream, an indication that at least one pixel within the palette coded block is to be decoded as an escape pixel having a color value that is not included in the palette; and
based on the at least one pixel within the palette coded block being decoded as an escape pixel:
determine a palette quantization parameter (QP) value for the palette coded block, the palette QP value being adjusted from a predicted QP value,
decode, from the received bitstream, a quantized color value for the escape pixel, and
inverse quantize the color value for the escape pixel according to the palette QP value.

13. The device of claim 12, wherein the palette QP value comprises a luma palette QP value and at least one chroma palette QP value.

14. The device of claim 12, wherein the palette coded block is included in a current quantization group, and wherein the predicted QP value comprises one of a slice-level QP value or a QP value associated with a block included in a previous quantization group.

15. The device of claim 12, wherein the one or more processors are configured to:
determine a delta QP value for a current quantization group that includes the palette coded block; and
adjust the predicted QP value based on the delta QP value in order to determine the palette QP value for the palette coded block.

16. The device of claim 12, wherein the one or more processors are configured to:
in the case that a delta QP value has been previously determined for a current quantization group that includes the palette coded block, adjust the predicted QP value based on the previously determined delta QP value in order to determine the palette QP value for the palette coded block; and
in the case that a delta QP value has not been previously determined for the current quantization group, determine a palette delta QP value for the palette coded block, and adjust the predicted QP value based on the palette delta QP value in order to determine the palette QP value for the palette coded block.

17. The device of claim 16, wherein the one or more processors are configured to:
determine whether delta QP values are enabled for palette coded blocks; and
based on delta QP values being enabled for palette coded blocks, determine the palette delta QP value for the palette coded block.

18. The device of claim 12, wherein the palette QP value comprises a luma palette QP value, and wherein the one or more processors are configured to:
based on the at least one pixel within the palette coded block being decoded as an escape pixel, determine a chroma QP offset value for a current quantization group that includes the palette coded block; and
adjust the luma palette QP value determined for the palette coded block based on the chroma QP offset value in order to determine a chroma palette QP value for the palette coded block.

19. The device of claim 12, wherein the palette QP value comprises a luma palette QP value, and wherein the one or more processors are configured to:
based on the at least one pixel within the palette coded block being decoded as an escape pixel and in the case that a chroma QP offset value has been previously determined for a current quantization group that includes the palette coded block, adjust the luma palette QP value determined for the palette coded block based on the previously determined chroma QP offset value in order to determine a chroma palette QP value for the palette coded block; and
based on the at least one pixel within the palette coded block being decoded as an escape pixel and in the case that a chroma QP offset value has not been previously determined for the current quantization group, determine a palette chroma QP offset value for the palette coded block, and adjust the luma palette QP value determined for the palette coded block based on the palette chroma QP offset value in order to determine the chroma palette QP value for the palette coded block.

20. The device of claim 19, wherein the one or more processors are configured to:
determine whether chroma QP offset values are enabled for palette coded blocks; and
based on chroma QP offset values being enabled for palette coded blocks, determine the palette chroma QP offset value for the palette coded block.

21. The device of claim 12, wherein the one or more processors are configured to:
- determine whether the palette coded block is a first block in a current quantization group or whether any previous non-palette coded blocks in the current quantization group include non-zero coefficients;
- based on the palette coded block being the first block in the current quantization group or none of the previous non-palette coded blocks in the current quantization group including non-zero coefficients, determine the palette QP value adjusted from the predicted QP value, the palette QP value including luma and chroma palette QP values; and
- based on the palette coded block not being the first block in the current quantization group and at least one of the previous non-palette coded blocks in the current quantization group including non-zero coefficients, determine the palette QP value to be equal to a quantization group QP value previously determined for the at least one previous non-palette coded blocks in the current quantization group, the quantization group QP value including luma and chroma QP values.

22. The device of claim 12, wherein the one or more processors are configured to:
- decode a first syntax element from the received bitstream indicating that the at least one pixel within the palette coded block is to be decoded as an escape pixel;
- based on the at least one pixel within the palette coded block being decoded as an escape pixel and in the case that a delta QP value has not been previously determined for a block included in a current quantization group that also includes the palette coded block, decode a second syntax element from the received bitstream indicating a palette delta QP value for the palette coded block, and adjust the predicted QP value based on the palette delta QP value in order to determine the palette QP value for the palette coded block; and
- based on the at least one pixel within the palette coded block being decoded as an escape pixel and in the case that a delta QP value has been previously determined for a block included in the current quantization group, adjust the predicted QP value based on the previously determined delta QP value in order to determine the palette QP value for the palette coded block without decoding a delta QP value for the palette coded block.

23. The device of claim 12, wherein the video decoding device comprises at least one of:
- an integrated circuit;
- a microprocessor; or
- a wireless communication device.

24. A video decoding device comprising:
- means for determining a palette for a palette coded block including zero or more palette entries that indicate one or more respective color values;
- means for decoding, from a received bitstream, an indication that at least one pixel within the palette coded block is to be decoded as an escape pixel having a color value that is not included in the palette; and
- means for, based on the at least one pixel within the palette coded block being decoded as an escape pixel:
  - determining a palette quantization parameter (QP) value for the palette coded block, the palette QP value being adjusted from a predicted QP value,
  - decoding, from the received bitstream, a quantized color value for the escape pixel, and
  - inverse quantizing the color value for the escape pixel according to the palette QP value.

25. A non-transitory computer-readable medium having stored thereon instructions for decoding video data that, when executed, cause one or more processors to:
- determine a palette for a palette coded block including zero or more palette entries that indicate one or more respective color values;
- decode, from a received bitstream, an indication that at least one pixel within the palette coded block is to be decoded as an escape pixel having a color value that is not included in the palette; and
- based on the at least one pixel within the palette coded block being decoded as an escape pixel:
  - determine a palette quantization parameter (QP) value for the palette coded block, the palette QP value being adjusted from a predicted QP value,
  - decode, from the received bitstream, a quantized color value for the escape pixel, and
  - inverse quantize the color value for the escape pixel according to the palette QP value.

26. A method of encoding video data, the method comprising:
- determining a palette for a palette coded block including zero or more palette entries that indicate one or more respective color values;
- encoding, in a bitstream, an indication that at least one pixel within the palette coded block is encoded as an escape pixel having a color value that is not included in the palette; and
- based on the at least one pixel within the palette coded block being encoded as an escape pixel:
  - determining a palette quantization parameter (QP) value for the palette coded block, the palette QP value being adjusted from a predicted QP value,
  - quantizing the color value for the escape pixel according to the palette QP value, and
  - encoding, in the bitstream, the quantized color value for the escape pixel.

27. The method of claim 26,
- wherein encoding the indication comprises encoding a first syntax element in the bitstream indicating that the at least one pixel within the palette coded block is encoded as an escape pixel; and
- wherein, based on the at least one pixel within the palette coded block being encoded as an escape pixel, determining the palette QP value comprises:
  - in the case that a delta QP value has not been previously determined for a block included in a current quantization group that also includes the palette coded block, determining the palette QP value for the palette coded block, determining a palette delta QP value as a difference between the palette QP value and the predicted QP value, and encoding a second syntax element in the bitstream indicating the palette delta QP value for the palette coded block; and
  - in the case that a delta QP value has been previously determined for a block included in the current quantization group, adjusting the predicted QP value based on the previously determined delta QP value in order to determine the palette QP value for the palette coded block, without encoding a delta QP value for the palette coded block.

28. A video encoding device comprising:
- a memory configured to store video data; and
- one or more processors in communication with the memory and configured to:

determine a palette for a palette coded block including zero or more palette entries that indicate one or more respective color values;

encode, in a bitstream, an indication that at least one pixel within the palette coded block is encoded as an escape pixel having a color value that is not included in the palette; and based on the at least one pixel within the palette coded block being encoded as an escape pixel:
- determine a palette quantization parameter (QP) value for the palette coded block, the palette QP value being adjusted from a predicted QP value,
- quantize the color value for the escape pixel according to the palette QP value, and
- encode, in the bitstream, the quantized color value for the escape pixel.

29. The device of claim 28, wherein the one or more processors are configured to:

encode a first syntax element in the bitstream indicating that the at least one pixel within the palette coded block is encoded as an escape pixel;

based on the at least one pixel within the palette coded block being encoded as an escape pixel and in the case that a delta QP value has not been previously determined for a block included in a current quantization group that also includes the palette coded block, determine the palette QP value for the palette coded block, determining a palette delta QP value as a difference between the palette QP value and the predicted QP value, and encode a second syntax element in the bitstream indicating the palette delta QP value for the palette coded block; and based on the at least one pixel within the palette coded block being encoded as an escape pixel and in the case that a delta QP value has been previously determined for a block included in the current quantization group, adjust the predicted QP value based on the previously determined delta QP value in order to determine the palette QP value for the palette coded block, without encoding a delta QP value for the palette coded block.

* * * * *